US010353191B2

(12) United States Patent
Anthony et al.

(10) Patent No.: US 10,353,191 B2
(45) Date of Patent: Jul. 16, 2019

(54) CIRCULAR SCANNING TECHNIQUE FOR LARGE AREA INSPECTION

(71) Applicant: Massachusetts Institute of Technology, Cambridge, MA (US)

(72) Inventors: Brian W. Anthony, Cambridge, MA (US); Xian Du, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 51 days.

(21) Appl. No.: 15/540,169

(22) PCT Filed: Jan. 13, 2016

(86) PCT No.: PCT/US2016/013157
§ 371 (c)(1),
(2) Date: Jun. 27, 2017

(87) PCT Pub. No.: WO2016/115203
PCT Pub. Date: Jul. 21, 2016

(65) Prior Publication Data
US 2017/0371142 A1 Dec. 28, 2017

Related U.S. Application Data

(60) Provisional application No. 62/104,143, filed on Jan. 16, 2015, provisional application No. 62/102,784, filed on Jan. 13, 2015.

(51) Int. Cl.
*G02B 21/00* (2006.01)
*G02B 21/36* (2006.01)
(Continued)

(52) U.S. Cl.
CPC ....... *G02B 21/367* (2013.01); *G02B 21/0072* (2013.01); *G02B 26/10* (2013.01); *H04N 1/00* (2013.01); *H04N 1/00018* (2013.01)

(58) Field of Classification Search
None
See application file for complete search history.

(56) References Cited

U.S. PATENT DOCUMENTS 5,686,960 A 11/1997 Sussman et al.
5,805,659 A 9/1998 Tam
(Continued)

OTHER PUBLICATIONS

International Preliminary Report on Patentability dated Jul. 27, 2017 from International Application No. PCT/US2016/013157; 10 Pages.

(Continued)

*Primary Examiner* — Vikkram Bali
(74) *Attorney, Agent, or Firm* — Daly, Crowley, Mofford & Durkee LLP

(57) ABSTRACT

Described embodiments provide a method of generating an image of a region of interest of a target object. A plurality of concentric circular scan trajectories are determined to sample the region of interest. Each of the concentric circular scan trajectories have a radius incremented from an innermost concentric circular scan trajectory having a minimum radius to an outermost concentric circular scan trajectory having a maximum radius. A number of samples are determined for each of the concentric circular scan trajectories. A location of each sample is determined for each of the concentric circular scan trajectories. The locations of each sample are substantially uniformly distributed in a Cartesian coordinate system of the target object. The target object is iteratively rotated along each of the concentric circular scan trajectories and images are captured at the determined sample locations to generate a reconstructed image from the captured images.

27 Claims, 19 Drawing Sheets

(51) Int. Cl.
*H04N 1/00* (2006.01)
*G02B 26/10* (2006.01)

(56) References Cited

U.S. PATENT DOCUMENTS

| | | | |
|---|---|---|---|
| 6,011,763 | A | 1/2000 | Labinksy et al. |
| 7,372,937 | B2 | 5/2008 | Wang et al. |
| 7,424,089 | B2 | 9/2008 | Zhang et al. |
| 2003/0099022 | A1 | 5/2003 | Karin et al. |
| 2010/0079608 | A1 | 4/2010 | Wong et al. |
| 2010/0128111 | A1* | 5/2010 | Pommerenke ....... G01B 11/245 348/50 |
| 2010/0142757 | A1 | 6/2010 | Sandstrom et al. |

OTHER PUBLICATIONS

PCT Search Report of the ISA for PCT Appl. No. PCT/US2016/013157 dated Mar. 11, 2016; 3 pages.
PCT Written Opinion of the ISA for PCT Appl. No. PCT/US2016/013157 dated Mar. 11, 2016; 12 pages.
Babacan, et al.; "Variational Bayesian Super Resolution;" IEEE Transactions on Image Processing; vol. 20; No. 4; Apr. 2011; 16 pages.
Babakhani, et al.; "A Comparison of the Performance Improvement by Collocated and Noncollocated Active Damping in Motion Systems;" IEEE/ASME Transactions on Mechatronics; vol. 18; No. 3; Jun. 2013; 9 pages.
Baker, et al.; "Limits on Super-Resolution and How to Break Them;" IEEE Transactions on Pattern Analysis and Machine Intelligence; vol. 24; No. 9; Sep. 2002; 17 pages.
Barnard, et al.; "High-Resolution Iris Image Reconstruction from Low-Resolution Imagery;" Advanced Signal Processing Algorithms, Architectures and Implementations XVI; Proc. of SPIE; vol. 6313, 6310D-1; Aug. 2006; 13 pages.
Blunt, et al.; "In-Line Metrology of Functional Surface with a Focus on Defect Assessment on Large Area Roll to Roll Substrates;" Proceedings of the 13th International Conference of the European Society for Precision Engineering and Nanotechnology; Berlin; May 2013; 4 pages.
Bobach, et al.; "Natural Neighbor Interpolation and Order of Continuity;" University of Kaiserslautern Computer Science Department; Jan. 2006; 18 pages.
Bonchev, et al.; "Improving Super-Resolution Image Reconstruction by In-Plane Camera Rotation;" 13th Conference on Information Fusion; Jan. 2010; 7 pages.
Borman, et al.; "Spatial Resolution Enhancement of Low-Resolution Image Sequences a Comprehensive Review with Directions for Future Research;" Laboratory for Image and Signal Analysis (LISA); Jul. 8, 1998; 64 pages.
Brown; "Multi-Channel Sampling of Low-Pass Signals;" IEEE Transactions on Circuits and Systems; vol. cas-28; No. 2; Feb. 1981; 6 pages.
Capel; "Image Mosaicing and Super-Resolution;" Robotics Research Group; The University of Oxford; Ph.D Thesis; Jan. 2001; 269 pages.
Cheo, et al.; "Post-Corrections of Image Distortions in a Scanning Grating-Based Spectral Line Imager;" IEEE Photonics Technology Letters; vol. 25; No. 12; Jun. 15, 2013; 4 pages.
Devasia, et al.; "A Survey of Control Issues in Nanopositioning;" IEEE Transactions on Control Systems Technology; vol. 15; No. 5; Sep. 2007; 22 pages.
Eielsen, et al.; "Damping and Tracking Control Schemes for Nanopositioning;" IEEE/ASME Transactions on Mechatronics; vol. 19; No. 2; Apr. 2014; 13 pages.
Ekberg; "Development of Ultra-Precision Tools for Metrology and Lithography of Large Area Photomasks and High Definition Displays;" KTH, School of Industrial Engineering and Management (ITM); Production Engineering, Metrology and Optics; Stockholm, Ph.D. Thesis; Jun. 2013; 121 pages.
Fleming, et al.; "An Experimental Comparison of PI, Inversion, and Damping Control for High Performance Nanopositioning;" 2013 American Control Conference (ACC); Jun. 17-19, 2013; 6 pages.
Freeman, et al.; "The Design and Use of Steerable Filters;" IEEE Transactions on Pattern Analysis and Machine Intelligence; vol. 13; No. 9; Sep. 1991; 16 pages.
Gotoh, et al.; "Color Super-Resolution from a Single CCD;" IEEE Workshop on Color and Photometric Methods in Computer Vision; Jan. 2003; 8 pages.
Greenbaum, et al.; "Imaging Without Lenses: Achievement and Remaining Challenges of Wide-Field On-Chip Microscopy;" Natural Methods; vol. 9; No. 9; Sep. 2012; 7 pages.
Gu, et al.; "Integral Resonant Damping for High-Bandwidth Control of Piezoceramic Stack Actuators with Asymmetric Hysteresis Nonlinearity;" Mechatronics 24; Jan. 2014; 9 pages.
Hansen, et al.; "Deblurring Images, Matrices, Spectra, and Filtering;" Fundamentals of Algorithms; Siam; Jan. 2006; 145 pages.
Haralick, et al.; "Textural Features for Image Classification;" IEEE Transactions on Systems, Man and Cybernetics; vol. SMC-3; No. 6; Nov. 1973; 12 pages.
Hardie, et al.; "High Resolution Image Reconstruction from a Sequence of Roasted and Translated Frames and its Application to an Infrared Imaging System;" Opt. Eng. vol. 37; Jan. 1998; 27 pages.
Hardie, et al.; "Joint MAP Registration and High-Resolution Image Estimation Using a Sequence of Undersampled Images;" IEEE Transactions on Image Processing; vol. 6; No. 12; Dec. 1997; 13 pages.
Huang, et al.; "Image Restoration by Singular Valve Decomposition;" Applied Optics; vol. 14; No. 9; Sep. 1975; 4 pages.
Irani, et al.; Improving Resolution by Image Registration; CVGIP; Graphical Models and Image Processing; vol. 53; No. 3; May 1991; 9 pages.
Jain, et al.; "Flexible Electronics and Displays: High-Resolution, Roll-to-Roll, Projection Lithography and Photoablation Processing Technologies for High-Throughput Production;" Proceedings of the IEEE; vol. 93; No. 8; Aug. 2005; 11 pages.
Ju, et al.; "Design of Optimal Fast Scanning Trajectory for the Mechanical Scanner of Measurement Instruments;" Scanning vol. 36; Mar. 18, 2013; 9 pages.
Keren, et al.; "Image Sequence Enhancement Using Sub-Pixel Displacements;" IEEE Computer Society Conference on Computer Vision and Pattern Recognition (CVPR 88); Jul. 1988; 5 pages.
Kirkpatrick, et al.; "Optimization by Simulated Annealing;" Science; vol. 220; No. 4598; May 13, 1983; 10 pages.
Leang, et al.; "Feedback-Linearized Inverse Feedforward for Creep, Hysteresis, and Vibration Compensation in AFM Piezoactuators;" IEEE Transactions on Control Systems Technology; vol. 15; No. 5; Sep. 2007; 9 pages.
Lehmann, et al.; "Survey: Interpolation Methods in Medical Image Processing;" IEEE Transactions on Medical Imaging; vol. 18; No. 11; Nov. 1999; 27 pages.
Lewis, et al.; "Scattered Data Interpolation and Approximation for Computer Graphics;" ACM Siggraph Asia 2010 Course Notes; Dec. 2010; 73 pages.
Ljubicic, et al.; "Development of a High-Speed Profilometer for Manufacturing Inspection;" Proc. SPIE 7767; Aug. 24, 2010; 8 pages.
Ljubicic; "High Speed Instrumentation for Inspection of Transparent Parts;" Massachusetts Institute of Technology; Thesis; Jun. 2013; Part 1; 150 pages.
Ljubicic; "High Speed Instrumentation for Inspection of Transparent Parts;" Massachusetts Institute of Technology; Thesis; Jun. 2013; Part 2; 136 pages.
Lowe; "Distinctive Image Features from Scale-Invariant Keypoints;" International Journal of Computer Vision; vol. 60; No. 2; Jan. 5, 2004; 28 pages.
Mahmood, et al.; "A New Scanning Method for Fast Atomic Force Microscopy;" IEEE Transactions on Nanotechnology; vol. 10; No. 2; Mar. 2011; 14 pages.
Mahmood, et al.; "Fast Spiral-Scan Atomic Force Microscopy;" IOP Publishing; Nanotechnology; vol. 20; Aug. 2009; 5 pages.

(56) References Cited

OTHER PUBLICATIONS

Maintz, et al.; "A Survey of Medical Image Registration;" Medial Image Analysis; vol. 2; No. 1; Mar. 1998; 36 pages.
Molina, et al.; "Image Restoration in Astronomy;" IEEE Signal Processing Magazine; Mar. 2001; 19 pages.
Nagahara, et al.; "Lensless Imaging for Wide Field of View;" Optical Engineering 54; Feb. 23, 2015; 9 pages.
Nathan, et al.; "Flexible Electronics: The Next Ubiquitous Platform;" Proceedings of the IEEE; vol. 100; May 13, 2012; 32 pages.
Park, et al.; "Super-Resolution Image Reconstruction: A Technical Overview;" IEEE Signal Processing Magazine; May 2003; 16 pages.
Papoulis; "Generalized Sampling Expansion;" IEEE Transactions on Circuits and Systems; vol. cas-24; No. 11; Nov. 1977; 3 pages.
Parker, et. al.; "Comparison of Interpolating Methods for Image Resampling;" IEEE Transactions on Medical Imaging; vol. MI-2; No. 1; Mar. 1983; 9 pages.
Patti, et al.; "Superresolution Video Reconstruction with Arbitrary Sampling Lattices and Nonzero Aperture Time;" IEEE Transactions on Image Processing; vol. 6; No. 8; Aug. 1997; 13 pages.
Peleg, et al.; "Improving Image Resolution Using Subpixel Motion;" Pattern Recognition Letters 5; Mar. 1987; 4 pages.
Pham, et al.; "Influence of Signal-to-Noise Ratio and Point Spread Function on Limits of Super-Resolution;" Image Processing: Algorithms and Systems IV; Proc. of SPIE-IS&T Electronic Imaging; Jan. 2005; 12 pages.
Pham, et al.; "Robust Fusion of Irregularly Sampled Data Using Adaptive Normalized Convolution;" EURASIP Journal on Advances in Signal Processing; May 17, 2005; 17 pages.
Poletto; "Enhancing the Spatial Resolution of a Two-Dimensional Discrete Array Detector;" Optical Engineering vol. 38; Oct. 1999; 10 pages.
Prasad; "Digital Superresolution and the Generalized Sampling Theorem;" Optical Society of America; vol. 24; No. 2; Feb. 2007; 15 pages.
Ribaric, et al.; "Restoration of Images Blurred by Circular Motion;" First International Workshop on Image and Signal Processing and Analysis; Jun. 14-15, 2000; 8 pages.
Robinson, et al.; "Fundamental Performance Limits in Image Registration;" Proceedings of the 2003 International Conference on Image Processing; Sep. 2003; 4 pages.
Rogers, et al.; "Materials and Mechanics for Stretchable Electronics;" Science; vol. 327; Mar. 26, 2010; 6 pages.
Shewchuk; "Lecture Notes on Delaunay Mesh Generation;" Electrical Engineering and Computer Science; University of California, Berkeley; Sep. 20, 1999; 119 pages.
Stark, et al.; "High-Resolution Image Recovery from Image-Plane Arrays, Using Convex Projections;" Journal of Optical Society of America; vol. 6; No. 11; Nov. 1989; 12 pages.
Tatem, et al; "Super-Resolution Target Identification from Remotely Sensed Images Using a Hopfield Neural Network;" IEEE Transactions on Geoscience and Remote Sensing; vol. 39; No. 4; Apr. 2001; 16 pages.
Tuma, et al.; "High-Speed Multiresolution Scanning Probe Microscopy Based on Lissajous Scan Trajectories;" IOP Publishing; Nanotechnology 23; Apr. 20, 2012; 9 pages.
Tuma, et al.; "Optimal Scan Trajectories for High-Speed Scanning Probe Microscopy;" 2012 American Control Conference; Fairmont Queen Elizabeth, Montreal, Canada; Jun. 27-29, 2012; 6 pages.
Ur, et al.; "Improved Resolution from Subpixel Shifted Pictures;" CVGIP: Graphical Models and Image Processing; vol. 54; No. 2; Mar. 1992; 6 pages.
Vandewalle, et al.; "A Frequency Domain Approach to Registration of Aliased Images with Application to Super-resolution;" EURASIP Journal on Applied Signal Processing; vol. 2006; Article ID 71459; 14 pages.
Villena, et al.; "Bayesian Combination of Sparse and Non-Sparse Priors in Image Super Resolution;" Journal Digital Signal Processing; vol. 23; Issue 2; Mar. 2014; 12 pages.
Villena, et al.; "Bayesian Super-Resolution Image Reconstruction using an $\ell$ 1 prior;" Proceedings of the $6^{th}$ International Symposium on Image and Signal Processing Analysis; Sep. 2009; 6 pages.
Wagner, et al.; "Distributed Image Compression for Sensor Networks Using Correspondence Analysis and Super-Resolution;" Proceedings of the 2003 International Conference on Image Processing; Sep. 2003; 4 pages.
Weckenmann, et al.; "Multisensor Data Fusion in Dimensional Metrology;" CIRP Annals—Manufacturing Technology; vol. 58; Dec. 2009; 21 pages.
Wheeler, et al.; "Super-Resolution Image Synthesis Using Projections onto Convex Sets in the Frequency Domain;" Proc. SPIE5674; Computational Imaging III, 479; Mar. 31, 2005; 12 pages.
Yong, et al.; "High-Speed Cycloid-Scan Atomic Force Microscopy;" IP Publishing; Nanotechnology 13; vol. 21; No. 36; Aug. 13, 2010; 5 pages.
Zomet, et al.; "Robust Super-Resolution;" Proceedings of the 2001 IEEE Computer Society Conference on Computer Vision and Pattern Recognition; Dec. 2001; 6 pages.
Du, et al.; "Concentric circle scanning system for large-area and high-precision imaging"; Optics Express 20014; vol. 23; No. 15; Jul. 27, 2015; 16 Pages.
Du, et al.; "Concentric circular trajectory sampling for super-resolution and image mosaicing"; 2015 Optical Society of America; vol. 32; No. 2; pp. 293-304; Feb. 2015; 12 Pages.
PCT Search Report and Written opinion of the ISA dated Dec. 21, 2017 for International Application No. PCT/US2017/052276; 17 Pages.

* cited by examiner

600

602

604

800

FIG. 12
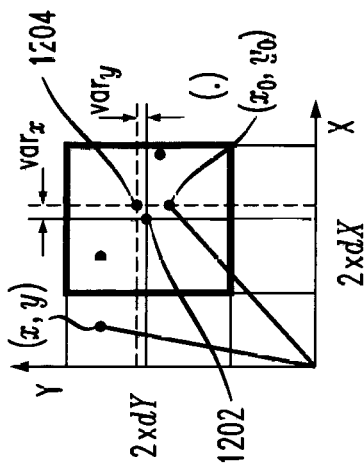
(a)
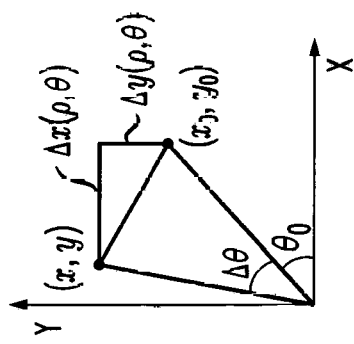
(c)
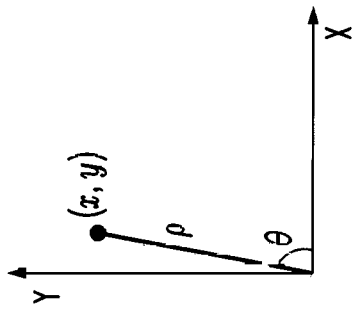
(c)

FIG. 14
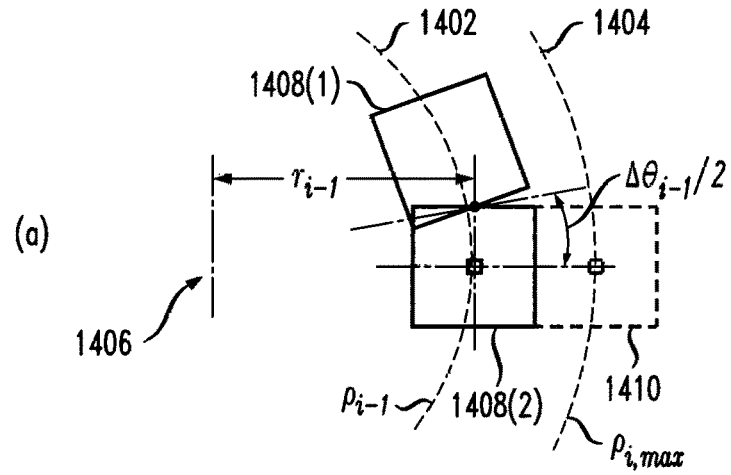
(a)
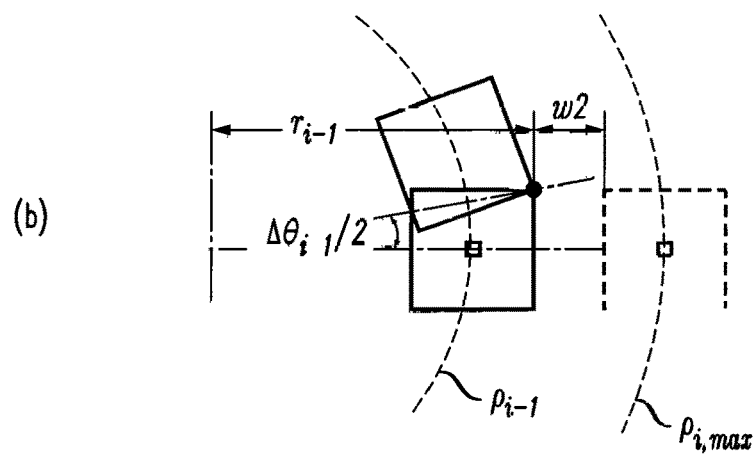
(b)
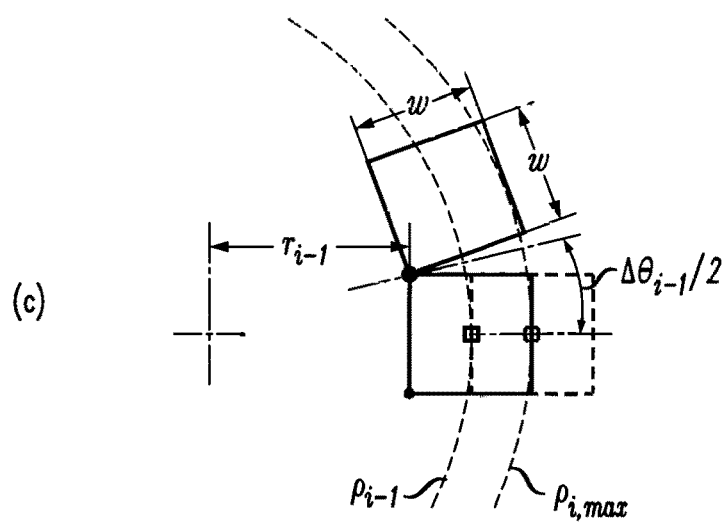
(c)

CIRCULAR SCANNING TECHNIQUE FOR LARGE AREA INSPECTION

CROSS REFERENCE TO RELATED APPLICATIONS

This application is a U.S. National Stage of PCT application PCT/US2016/013157 filed in the English language on Jan. 13, 2016, and entitled "CIRCULAR SCANNING TECHNIQUE FOR LARGE AREA INSPECTION," which claims the benefit under 35 U.S.C. § 119 of provisional application Nos. 62/104,143 filed Jan. 16, 2015 and 62/102,784 filed Jan. 13, 2015, both of which are hereby incorporated herein by reference in their entireties.

STATEMENT REGARDING FEDERALLY SPONSORED RESEARCH

This invention was made with Government support under Grant No. CMMI1025020 awarded by the National Science Foundation. The Government has certain rights in the invention.

BACKGROUND

Large-area microscopy, sampling, super-resolution (SR) and image mosaicing has many applications. For example, demand for miniature and low-cost electronic devices, along with advances in materials, drives semiconductor and device manufacturing toward micro-scale and nano-scale patterns in large areas. Similarly, large-view and high precision imaging devices such as microscopes might be desirable for scientific and medical imaging. To inspect high-resolution patterns over a large range requires high-precision imaging technologies. For example, fast frame grabbers and optical microscopy techniques facilitate imaging at micrometer and nanometer scales. However, the field of view (FOV) of high-resolution microscopes fundamentally limits detailed pattern imaging over a large area.

Some current large-area microscopy solutions employ large FOV and high-resolution optical sensors, such as higher-powered optics and larger charge-coupled device (CCD) arrays. However, these sensors increase the cost of the imaging system. Other current large-area microscopy solutions implement lens-free large-area imaging systems with large FOV using computational on-chip imaging tools or miniaturized mirror optics. On-chip imaging employs digital optoelectronic sensor arrays to directly sample the light transmitted through a large-area specimen without using lenses between the specimen and sensor chip. Miniaturized mirror optics systems employ various mirror shapes and projective geometries to reflect light arrays from larger FOV into the smaller FOV of camera. However, both on-chip imaging and miniaturized mirror optics systems achieve limited spatial resolution. Moreover, on-chip imaging is limited to transmission microscopy modalities, and miniaturized mirror optics experience distortion and low contrast (e.g., due to variations or defects in mirror surfaces, etc.).

An alternative approach to large-area microscopy is to implement high-precision scanners at an effective scanning rate and stitch individual FOV images together into a wide view. During this process, fast scanners acquire multiple frames over a region of interest (ROI). Raster scanning is commonly employed for scanning small-scale features over large areas. In raster scanning, samples are scanned back and forth in one Cartesian coordinate, and shifted in discrete steps in another Cartesian coordinate. Fast and accurate scanning requires precise positioning with low vibration and short settling times. However, fast positioning relies on high velocities and high accelerations that often induce mechanical vibrations. Techniques for reducing vibration in a raster scan tend to increase the size and cost of mechanical structures (e.g., requiring larger and more robust mechanical supports, etc.), or can be complex and/or sensitive to measurement noise during a scan (e.g., complex control systems, etc.).

Another approach to reducing mechanical vibrations is to employ smooth scanning trajectories that limit jerk and acceleration without additional large mechanical structures or complex control techniques. Such trajectories include spiral, cycloid, and Lissajous scan patterns, which allow high imaging speeds without exciting resonances of scanners and without complex control techniques. However, such scan trajectories do not achieve uniform sample point spatial distribution in Cartesian coordinates, resulting in distortion errors in sampled images.

Thus, there is a need for improved large-area microscopy, sampling, super-resolution (SR) and image mosaicing systems and techniques.

SUMMARY

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

In one aspect, a method of generating an image of a region of interest of a target object is provided. A plurality of concentric circular scan trajectories are determined to sample the region of interest. Each of the concentric circular scan trajectories have a radius incremented from an innermost concentric circular scan trajectory having a minimum radius to an outermost concentric circular scan trajectory having a maximum radius. A number of samples are determined for each, of the concentric circular scan trajectories. A location of each sample is determined for each of the concentric circular scan trajectories. The locations of each sample are substantially uniformly distributed in a Cartesian coordinate system of the target object. The target object is iteratively rotated along each of the concentric circular scan trajectories and images are captured at the determined sample locations to generate a reconstructed image from the captured images.

In an embodiment, rotating the target object includes rotating the target object at a determined constant angular velocity, the determined constant angular velocity reducing vibration of the target object. In another embodiment, rotating the target object includes rotating the target object at a determined constant linear velocity.

In an embodiment, the region of interest is circular, and the maximum radius is substantially equal to a radius of the region of interest.

In an embodiment, determining a location of each sample for each of the plurality of concentric circular scan trajectories includes mapping each sample location to Cartesian coordinates and interpolating one or more neighboring sample locations. In some embodiments, the interpolating is nearest-neighbor interpolation. In other embodiments, the interpolating is linear interpolation.

In an embodiment, determining a number of samples for each of the plurality of concentric circular scan trajectories includes determining, for each concentric circular scan trajectory, an angle increment and a radius increment. Based upon the determined angle increment and the determined radius increment, a number of samples, a rotation speed, and a plurality of rotation angles are determined for each concentric circular scan trajectory.

In an embodiment, a simulated annealing search is performed to optimize the one or more concentric circular scan trajectories.

In an embodiment, each of the plurality of rotation angles for each concentric circular scan trajectory is associated with a sample location.

In an embodiment, at least one of angular motion, rotational motion and pixel coverage area are constrained to interpolate one or more neighboring sample locations to overlap pixels on neighboring concentric circular scan trajectories.

In an embodiment, generating a reconstructed image from the captured images includes performing super resolution (SR) on a sequence of the captured images to generate a high resolution output image. In some embodiments, performing super resolution includes capturing a sequence of low resolution images for each concentric circular scan trajectory, performing iterative backpropagation to generate one or more super resolution images having sub-pixel resolution of corresponding ones of the sequence of low resolution images, and transforming the one or more super resolution images from a polar coordinate system to a Cartesian coordinate system.

In an embodiment, generating a reconstructed image further includes performing mosaicing of the one or more transformed super resolution images to generate a high resolution wide field of view composite output image. In an embodiment, performing mosaicing includes stitching together one or more super resolution images for each concentric circular scan trajectory. In an embodiment, stitching together one or more super resolution images for each concentric circular scan trajectory independently of other concentric circular scan trajectories.

In an embodiment, reducing blurring and noise effects in the sequence of low resolution images is performed by truncating singular value decomposition.

In an embodiment, capturing the sequence of low resolution images includes dividing each concentric circular scan trajectory into segments, each segment having a determined radial resolution and a determined angular resolution. A regular shift is applied in sub-pixel steps in a radial direction for each concentric circular scan trajectory to acquire low resolution images. In some embodiments, the regular shift step is based upon a pixel size of the high resolution output image.

In an embodiment, a camera frame rate of the imaging system, an illumination level of the imaging system, a translational movement speed of a target stage of the imaging system and a rotational movement speed of the target stage are synchronized.

In another aspect, an imaging system for generating an image of a region of interest of a target object is provided. The imaging system includes a camera to capture images of the target object, an illumination source to illuminate the target object and a target stage to receive the target object. The target stage provides a translational movement and a rotational movement of the target object. A controller operates to determine a plurality of concentric circular scan trajectories to sample the region of interest, each of the plurality of concentric circular scan trajectories having a radius incremented by a pitch value from an innermost concentric circular scan trajectory having a minimum radius to an outermost concentric circular scan trajectory having a maximum radius. The controller determines a number of samples for each of the plurality of concentric circular scan trajectories and determine a location of each sample for each of the plurality of concentric circular scan trajectories. The locations of each sample are substantially uniformly distributed in a Cartesian coordinate system of the target object to reduce image distortion. The controller controls the camera and target stage to iteratively rotate the target object along each of the concentric circular scan trajectories and capture images at the determined sample locations. The controller generates a reconstructed image from the captured images.

In an embodiment, the target stage rotates the target object at a determined constant angular velocity, the determined constant angular velocity reducing vibration of the target object. In another embodiment, the target stage rotates the target object at a determined constant linear velocity.

In an embodiment, determining a location of each sample for each of the plurality of concentric circular scan trajectories includes mapping each sample location to Cartesian coordinates and interpolating one or more neighboring sample locations. In some embodiments, the interpolating is nearest-neighbor interpolation. In other embodiments, the interpolating is linear interpolation.

In an embodiment, determining a number of samples for each of the plurality of concentric circular scan trajectories includes determining, for each concentric circular scan trajectory, an angle increment and a radius increment. Based upon the determined angle increment and the determined radius increment, a number of samples, a rotation speed, and a plurality of rotation angles are determined for each concentric circular scan trajectory.

In an embodiment, a simulated annealing search is performed to optimize the one or more concentric circular scan trajectories.

In an embodiment, each of the plurality of rotation angles for each concentric circular scan trajectory is associated with a sample location.

In an embodiment, at least one of angular motion, rotational motion and pixel coverage area are constrained to interpolate one or more neighboring sample locations to overlap pixels on neighboring concentric circular scan trajectories.

In an embodiment, generating a reconstructed image from the captured images includes performing super resolution (SR) on one or more of the captured images to generate a high resolution output image. In some embodiments, performing super resolution includes capturing a sequence of low resolution images for each concentric circular scan trajectory, performing iterative backpropagation to generate one or more super resolution images having sub-pixel resolution of corresponding ones of the sequence of low resolution images, and transforming the one or more super resolution images from a polar coordinate system to a Cartesian coordinate system.

In an embodiment, generating a reconstructed image further includes performing mosaicing of the one or more transformed super resolution images to generate a high resolution wide field of view composite output image. In an embodiment, performing mosaicing includes stitching together one or more super resolution images for each concentric circular scan trajectory. In an embodiment, stitching together one or more super resolution images for each concentric circular scan trajectory independently of other concentric circular scan trajectories.

In an embodiment, reducing blurring and noise effects in the sequence of low resolution images is performed by truncating singular value decomposition.

In an embodiment, capturing the sequence of low resolution images includes dividing each concentric circular scan trajectory into segments, each segment having a determined radial resolution and a determined angular resolution. A regular shift is applied in sub-pixel steps in a radial direction for each concentric circular scan trajectory to acquire low resolution images. In some embodiments, the regular shift step is based upon a pixel size of the high resolution output image.

In an embodiment, a camera frame rate of the imaging system, an illumination level of the imaging system, a translational movement speed of a target stage of the imaging system and a rotational movement speed of the target stage are synchronized.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

Figure 8:
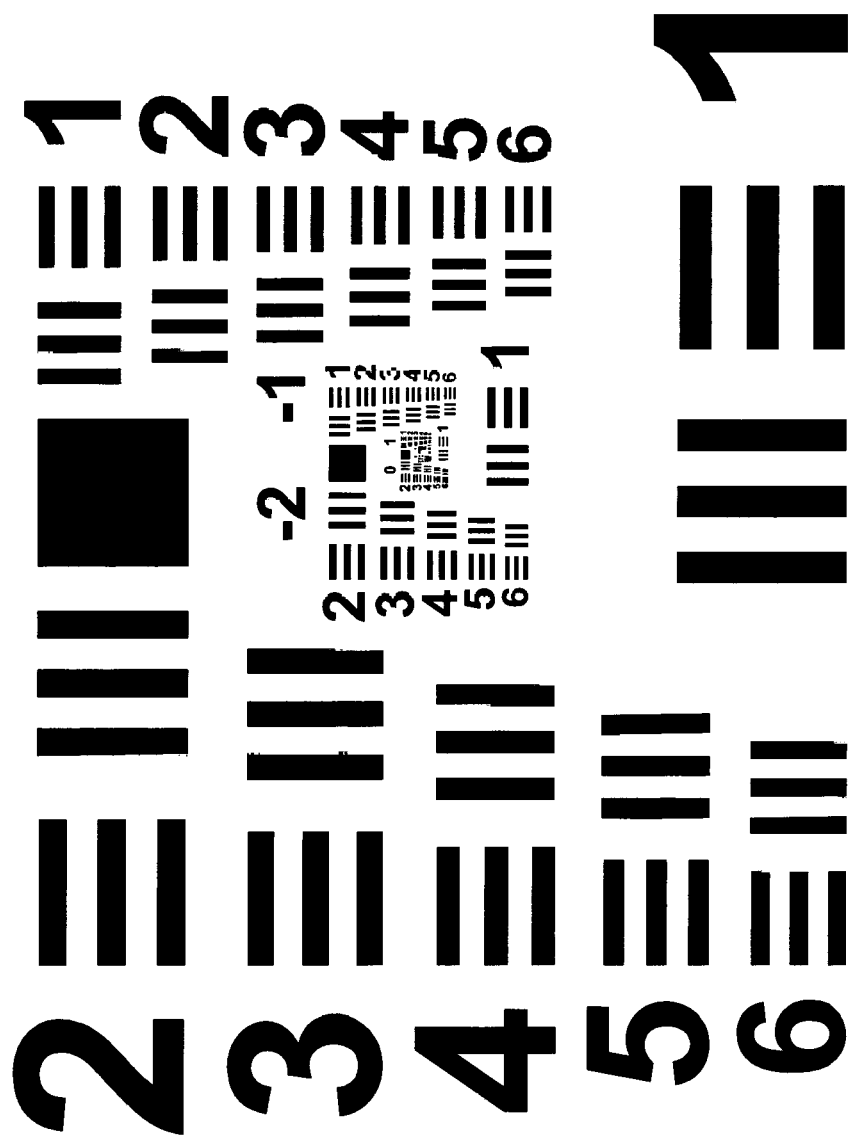
Figure 10:
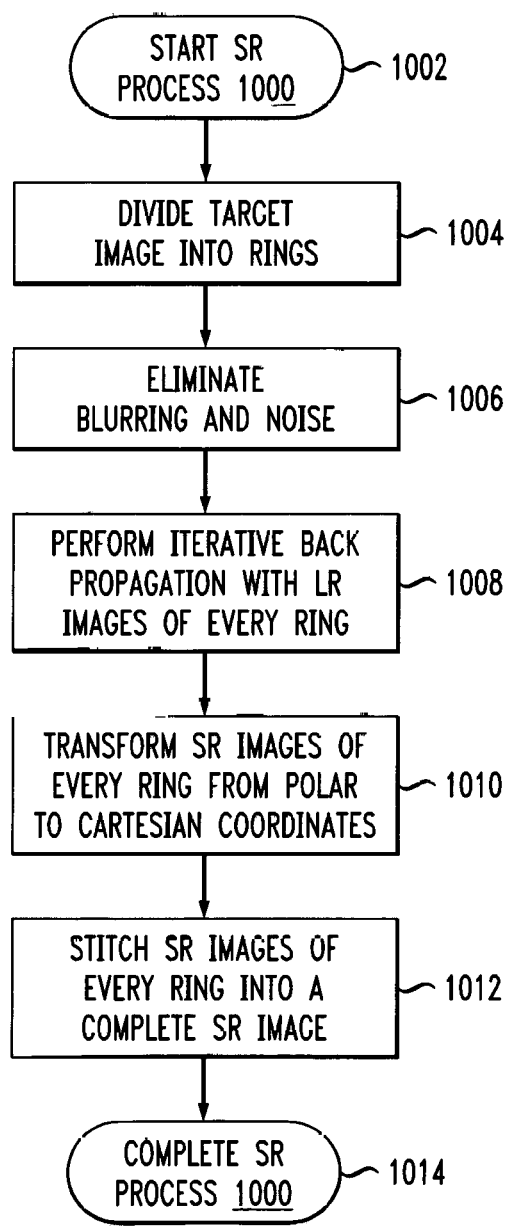
Figure 15:
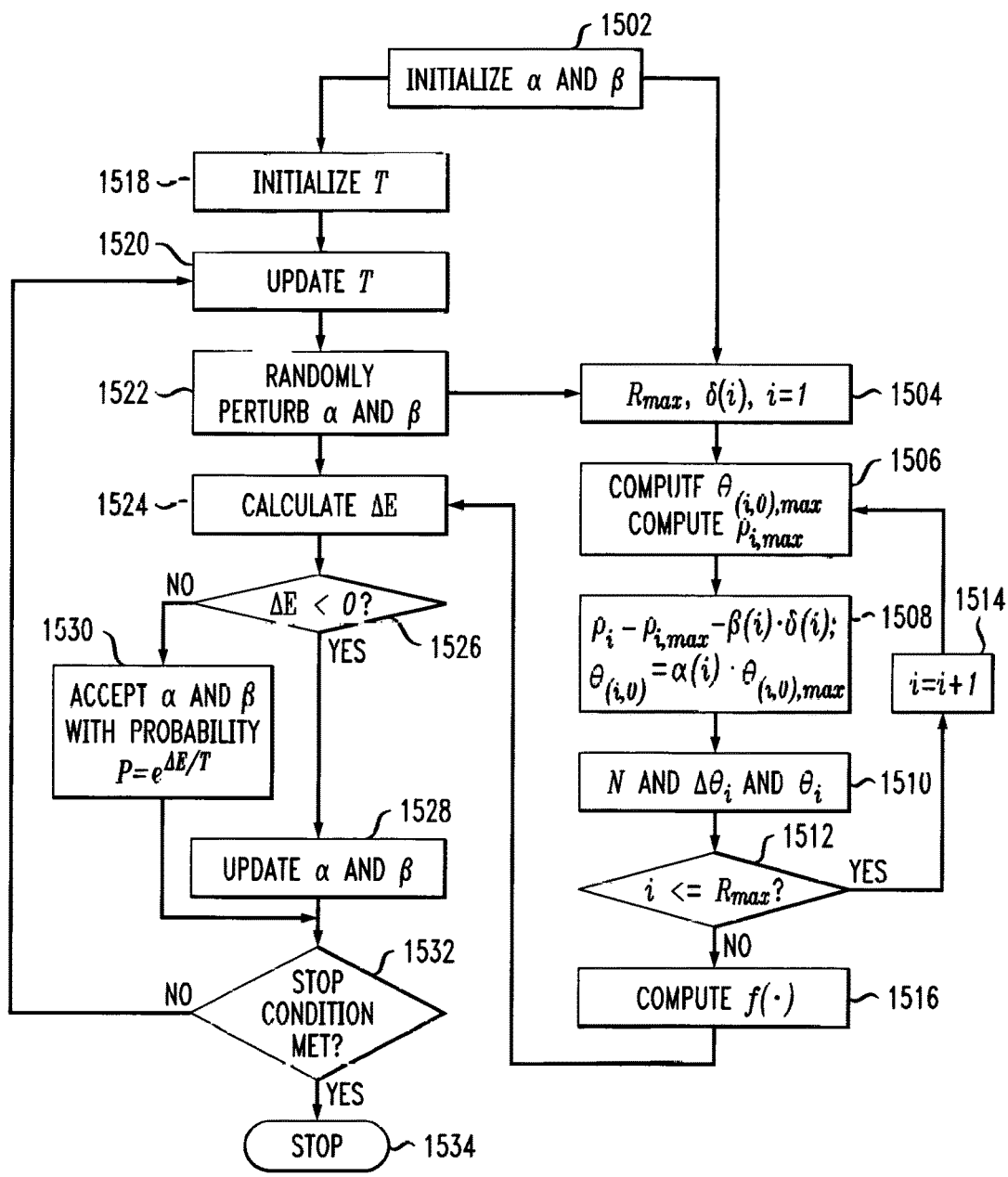
Figure 17:
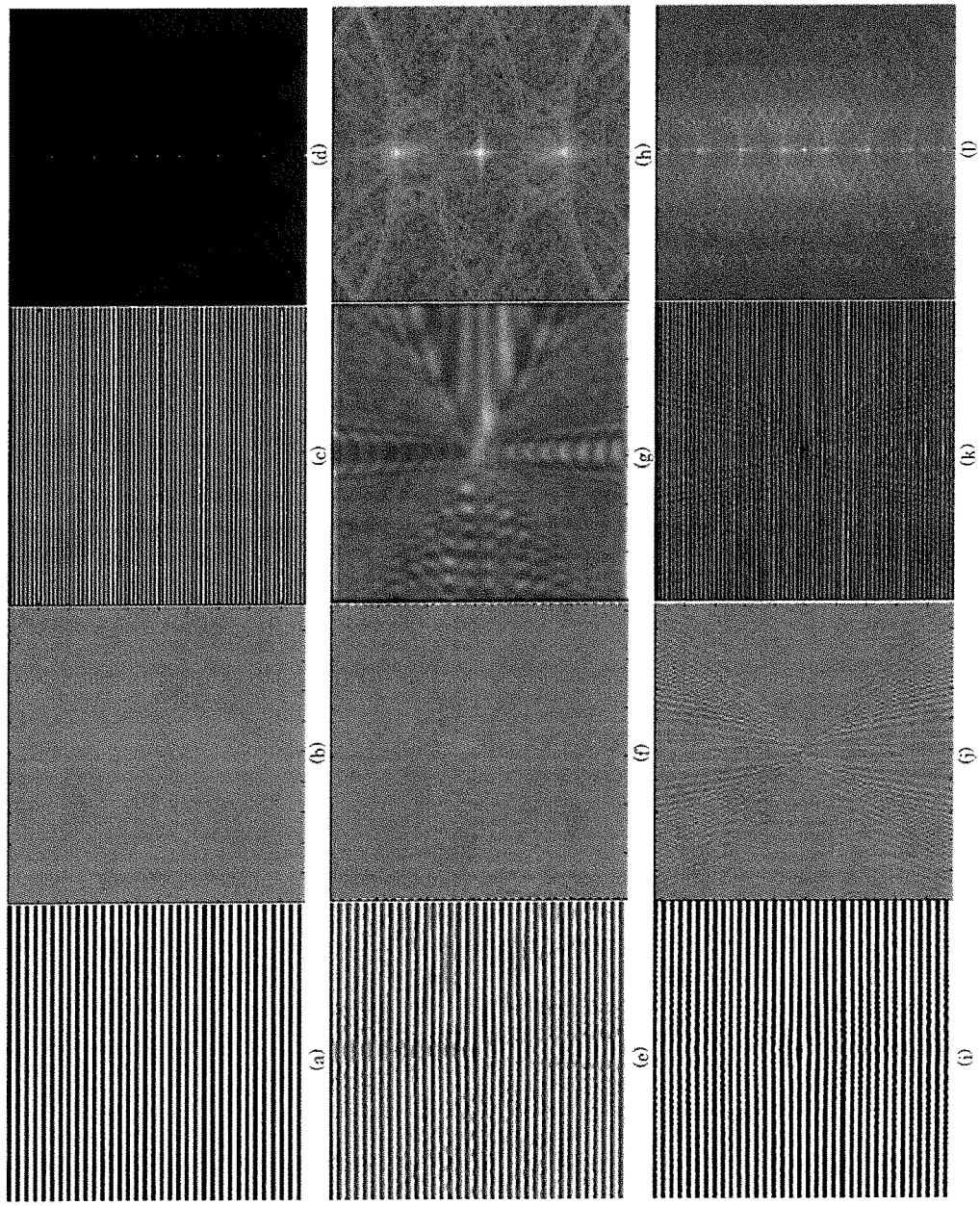

FIGS. 7(a)-7(f) are diagrams showing concentric circular scanning trajectories and sample points for an illustrative scan;

FIGS. 7(g)-7(i) are diagrams showing raster scanning trajectories and sample points for an illustrative scan;

FIG. 8 is a diagram showing the 1951 U.S. Air Force resolving power test target (MIL-STD-150A);

FIGS. 9(a)-(l) are diagrams showing reconstructed images of concentric circular scanning of the test target of FIG. 8;

FIG. 10 is a flow diagram showing a super-resolution technique in accordance with described embodiments;

FIGS. 11(a) and (b) are diagrams showing registration of camera pixels in a rotational imaging system in accordance with described embodiments;

FIG. 12(a) is a diagram showing an inter-conversion between polar coordinates and Cartesian coordinates, FIG. 12(b) is a diagram showing inter-conversion of circular sampling between polar coordinates and Cartesian coordinates, and FIG. 12(c) is a diagram showing rotational samples illustrated in the neighborhood of a Cartesian coordinate;

FIGS. 13(a) and 13(b) are diagrams showing initial rotation angle and angular sampling intervals, and composition sampling of two sampling rings in a Cartesian-cell grid;

FIGS. 14(a)-(c) are diagrams showing maximum ith ring radii defined by the intersections of rectangular pixels in the (i–1) ring;

FIG. 15 is a flow diagram showing an optimization technique of the sampling rings, in accordance with described embodiments;

FIGS. 16(a)-(l) are diagrams showing low resolution and super-resolution images generated by sampling a star-sector pattern in accordance with described embodiments;

FIGS. 17(a)-(l) are diagrams showing low resolution and super-resolution images generated by sampling parallel line patterns in accordance with described embodiments;

FIGS. 18(a)-(l) are diagrams showing Fourier transform spectral components of the super-resolution images of FIG. 17; and FIGS. 19(a)-(o) are diagrams showing high resolution images, low resolution images, super-resolution images, oriented energy and Fourier transform spectral components generated by sampling the test target of FIG. 8 in accordance with described embodiments.

DETAILED DESCRIPTION

Table 1 summarizes a list of acronyms employed throughout this specification as an aid to understanding the described embodiments:

TABLE 1

| CAV | Constant Angular Velocity | CCD | Charge-Coupled Device |
|---|---|---|---|
| CCTS | Concentric Circular Trajectory Sampling | CLV | Constant Linear Velocity |
| CPC | Continuous Polar Coordinates | CTS | Circular Trajectory Sampling |
| FOV | Field Of View | GST | Generalized Sampling Theorem |
| HPC | High resolution Polar Coordinates | HR | High Resolution |
| IBP | Iterative BackPropagation | LPC | Low resolution Polar Coordinates |
| LR | Low Resolution | NC | Normalized Convolution |
| NN | Nearest-Neighbor | OCCTS | Optimized Concentric Circular Trajectory Sampling |
| PSNR | Peak SNR | RMS | Root Mean Square |
| ROI | Region Of Interest | RS | Regular Shift |
| SAR | Simultaneous Auto-Regressive | SNR | Signal-to-Noise Ratio |
| SR | Super Resolution | SVD | Singular Value Decomposition |
| TV | Total Variation | | |

Electronics manufacturing of large-area surfaces that contain micro-scale and nano-scale features and large-view biomedical target imaging motivates the development of large-area, high-resolution and high-speed inspection and imaging systems. Compared to constant linear velocity scans and raster scans, constant angular velocity scans can significantly attenuate transient behavior while increasing the speed of imaging. Described embodiments provide for concentric circular trajectory sampling (CCTS) that demonstrates less vibration and lower mapping errors than raster scanning for creating a Cartesian composite image, while maintaining comparably fast scanning speed for large scanning area.

Described embodiments provide super-resolution (SR) image reconstruction and mosaicing based on circular trajectory sampling (CTS) and regular shift (RS) in radial and angular dimensions. The CTS computation is regularized to acquire composite images in Cartesian space. The RS includes dividing each (substantially equal) radius sampling ring evenly into star-sectors. Each star-sector shaped pixel can regularly shift in radial and angular dimensions for sub-pixel variation. SR techniques are applied in radial and angular dimensions ring-by-ring and extend one-pixel sampling to camera sampling to accurately discriminate SR pixels from noisy and blurry images. Described embodiments provide optimized concentric circular trajectory sampling (OCCTS) techniques to acquire image information uniformly at fast sampling speeds. Such techniques allow acquisition of multiple low-resolution images by conventional SR techniques by adding small variations in the angular dimension. Described OCCTS techniques reduce sampling time by more than 11.5% while maintaining 50% distortion error reduction and having at least 5.2% fewer distortion errors in comparison to previous CCTS techniques.

Described embodiments provide a vision system for imaging micro-scale and nano-scale features over large scan areas (e.g., on the order of a few square millimeters) by utilizing a high scan speed (e.g., on the order of mm/s). The embodiments synchronize a camera and rotary motor on a translation stage that can accurately acquire fine-detailed images in desired sampling positions. An optimized trapezoidal velocity profile is employed provide linear alignment of sample points, avoiding distortion and degradation in image reconstruction. Transients are attenuated by using concentric circular trajectory sampling (CCTS) instead of raster sampling. CCTS can employ various rotational velocity profiles, for example constant linear velocity (CLV) or constant angular velocity (CAV). CAV provides higher-speed scanning in larger areas without increasing motor speed or vibrations, thus achieving high speed imaging for large field of view (FOV) with high resolution.

A raster scan trajectory is composed of a series of scan lines and turnaround points of the lines that cause jerks and limit the smoothness of the trajectory. A traditional solution in industry is to overshoot the scan region, and avoid imaging the jerk points, since the jerk points occur near the scan line endpoints. Although easy to implement, overshooting the scan region increases scan time and does not fundamentally address the root cause of vibration near natural resonance frequency. However, described embodiments employing CCTS maintain continuity in high-order derivatives by smoothly sliding along the tangential direction.

Rotational scanning techniques can be described in terms of acceleration, velocity, position and scan time. A rotation path can be described by an instantaneous radius, r(t), and an azimuthal angle θ, where r(t)=αt, where t represents time and α represents radial-motion speed. Thus, rotational acceleration, a, is given by:

$$a = (\dot{\theta})^2 \alpha t \quad (1)$$

To maintain a constant rotational acceleration, rotational speed, $\dot{\theta}$, is given by $$\dot{\theta} = \left(\frac{a}{\alpha t}\right)^{1/2} = \left(\frac{a}{\alpha}\right)^{1/2} t^{-1/2} \quad (2)$$

and the rotational azimuthal angle θ is given by:

$$\theta = 2\left(\frac{a}{\alpha}\right)^{1/2} t^{1/2} + C \quad (3)$$

where C is a constant. Described CCTS techniques has a constant value of radius and constant acceleration in each circle when rotational speed is kept constant, which reduces jerks.

Figure 1:
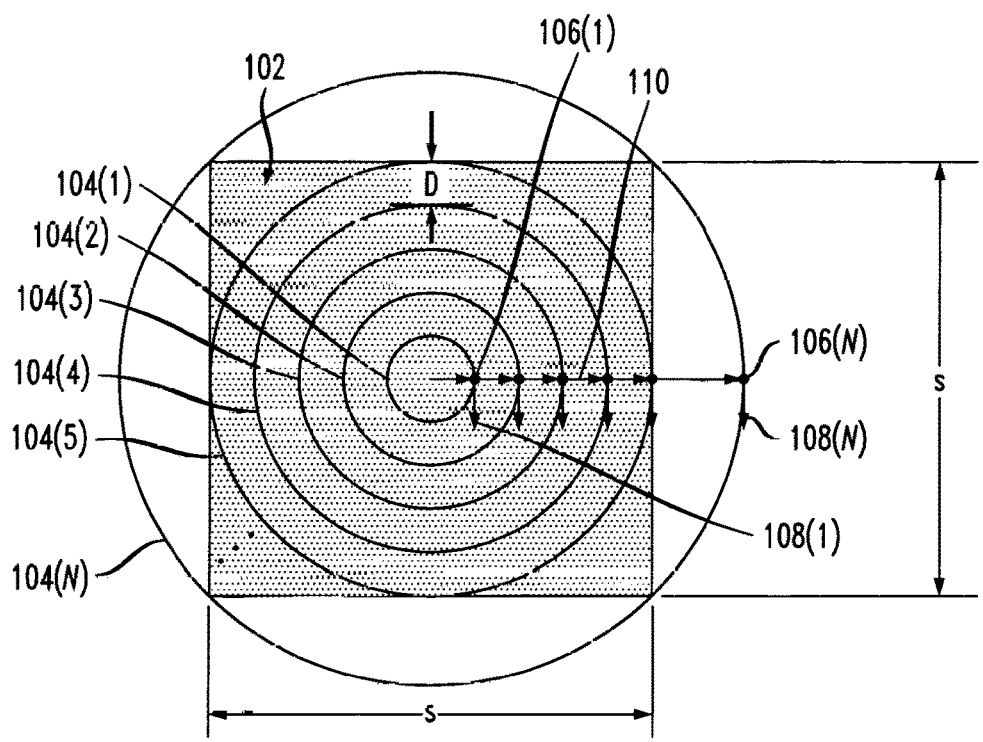
FIG. 1 is a diagram of an illustrative image scanning technique in accordance with described embodiments.

In described CCTS techniques, a concentric circular trajectory has a determined scan time, one or more determined turnaround points, a determined scan area of a region of interest (ROI), a determined constant acceleration, and a determined minimum spatial spectra/samples. For example, FIG. 1 shows an illustrative plot of a concentric circle scan of region of interest 102. Although shown in FIG. 1 as being square, region of interest 102 might be any shape, for example square, rectangular, circular (e.g., to better align with concentric circle scanning techniques, etc.), or any other shape. Region of interest 102 has a size, for example, a square having sides of length S (where, if region of interest 102 is circular, S is the radius; if region of interest 102 is rectangular, S is the larger dimension of the rectangle, etc.).

Described CCTS techniques include one or more concentric circular scan trajectories, shown as scan trajectories 104(1)-104(N), where N is a positive integer representing the number of concentric circular scan trajectories. Each of scan trajectories 104(1)-104(N) is separated by a determined distance, D, (e.g., pitch) that might be selected based on a desired imaging resolution for a given region of interest (e.g., based on the size of region of interest 102). The radii of each concentric scan circle are incremented linearly from central circles (e.g., scan trajectory 104(1)) to outer circles (e.g., scan trajectory 104(N)), for example as indicated by line 110. Turnaround points 106(1)-106(N) of the scan indicate the location on the scan trajectory where the scan moves to the next scan circle. Scans proceed along scan trajectories 104, for example in the direction indicated by arrows 108(1)-108(N).

Figure 2:
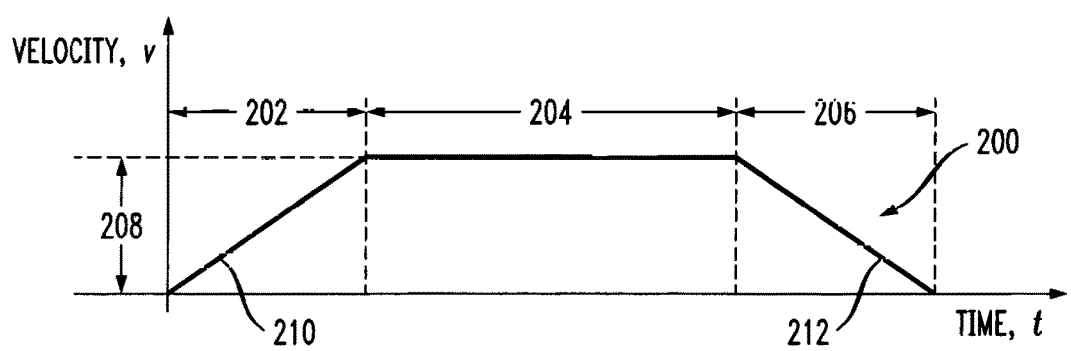
FIG. 2 is a diagram of a velocity profile of a scanning trajectory of the technique of FIG. 1.

Each one of scan trajectories 104 have a given velocity profile (e.g., a representation of the imagine system velocity during a scan). There are two types of constant rotation velocity: constant linear velocity (CLV) and constant angular velocity (CAV). Referring to FIG. 2, a trapezoidal velocity profile 200 is shown having three phases: constant acceleration time 202, constant velocity time 204, and constant deceleration time 206. Velocity profile 200 has a maximum velocity 208, a constant rotational acceleration (e.g., the slope of line segment 210) and a constant rotational deceleration (e.g., the slope of line segment 212).

Figure 3:
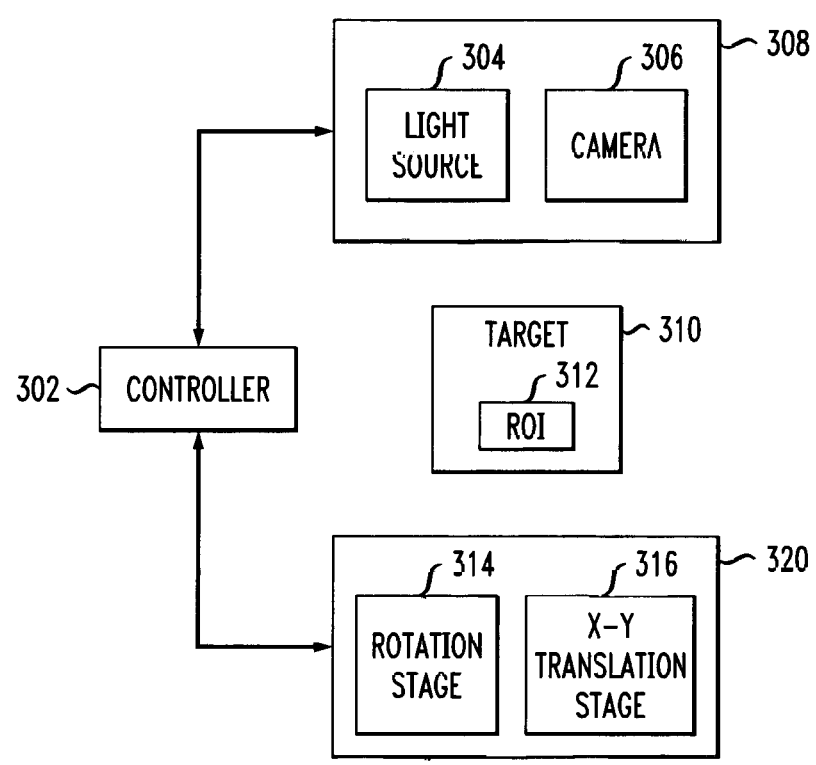
FIG. 3 is a block diagram showing an illustrative imaging system in accordance with described embodiments.

Referring to FIG. 3, a block diagram of imaging system 300 is shown. Imaging system 300 includes imager 308 and target support structure 320. Imager 308 includes light source 304 to illuminate target 310 and camera 306 to capture images of region of interest (ROI) 312 of target 310. Target support structure 320 includes rotation stage 314 to provide rotational movement of target 310 around a Z-axis with respect to imager 308, and X-Y translation stage 316 to provide X-Y translation movement of target 310 with respect to imager 308. The X, Y and Z-axes are orthogonal. Target 310 is placed on rotation stage 314 to allow imager 308 to scan ROI 312. Controller 302 controls motion of rotation stage 314 and X-Y translation stage 316 and operation of light source 304 and camera 306. In some embodiments, controller 302 includes a high-speed frame grabber (not shown) to capture images from camera 306.

In an embodiment, X-Y translation stage 316 allows movement of target 310 along the X and Y-axes with a workspace of 220×220 mm², a resolution of 20 nm and 40 MHz bandwidth feedback on the X and Y position. In an embodiment, rotation stage 314 allows rotation about the Z-axis with a resolution of 0.00001 degree, repeatability of 0.0003 degree, and absolute accuracy of 0.01 degree. X-Y translation stage 316 has a programmed maximum translational velocity of 40 mm/s along the X and Y-axes, and rotation stage 314 has a maximum rotational velocity of 720°/s rotation about the Z-axis. In an embodiment, camera 306 is a high-speed CMOS area-scan camera with a resolution of 1024×1280 (monochrome), a pixel pitch of 12 μm, and a maximum frame rate of 500 fbs. The incidence angle of camera 306 upon target 310 is substantially parallel to the Z-axis. In described embodiments, imager 308 is kept stationary during scans.

Referring back to FIG. 2, the constant acceleration and deceleration periods correspond to a phase of translation and rotation. In some embodiments, the constant rotational acceleration and the constant rotational deceleration are equal, and represented as the constant rotational acceleration, a. When the constant rotational acceleration and the constant rotational deceleration are equal, the motion times in constant acceleration time 202 and constant deceleration time 206 are given by:

$$T_A = \frac{v}{a} \quad (4)$$

where v is the rotational velocity, and a is the rotational acceleration. The motion distances for constant acceleration time 202 and constant deceleration time 206 are given by:

$$S_A = \frac{1}{2}a(T_A)^2 = \frac{v^2}{2a} \quad (5)$$

The motion distance for constant velocity time 204 is given by:

$$S_V = vT_V \quad (6)$$

where $T_V$ is the time duration of constant velocity time 204. The motion time for constant velocity time 204 is given by:

$$T_V = \frac{1}{v}(S - S_A - S_V) = \frac{1}{v}\left(S - \frac{v^2}{a}\right) \quad (7)$$

where S is the whole distance for one scan circle (e.g., a circumference of a given one of scan trajectories 104). Then, for one scan circle, the total motion time is given by:

$$T_{circle} = 2\left[\frac{1}{v}\left(S - \frac{v^2}{a}\right) + 2\frac{v}{a}\right] = 2\left(\frac{S}{v} + T_A\right) \quad (8)$$

The entire scan time for all the scan trajectories 104 (e.g., the entire time required to scan region of interest 102, which has an S² area as shown in FIG. 1) is given by:

$$T_{total} = 2N\left(\frac{S}{v} + T_A\right) \quad (9)$$

where N is the number of scan trajectories 104.

In instances where region of interest 102 is square, the raster scan area, $A_{raster}$, is equal to the area of the region of interest (e.g., $A_{raster}=S^2$). For a given pitch p, the number of lines in the raster scan is $$N_{lines} = \left\lceil \frac{S}{p} \right\rceil,$$

where ⌈ ⌉ denotes the ceiling integer function. Given a translational acceleration time $T_{AT}$, a translation speed v, and the translational scan time, $t_T$ is given by:

$$t_T = \left(\frac{S}{v} + T_{AT}\right) \cdot N_{lines} \quad (10)$$

For concentric circle scan trajectories, the outermost circle (e.g., scan trajectory 104(N)) needs a minimum radius, r, given by:

$$r = \frac{\sqrt{2}}{2}S \quad (11)$$

to reach all of the area of the square (or rectangle where S is the length of the longest side of the rectangle). Then the number of circles (e.g., scan trajectories 104), N, necessary for a pitch, p, is given by:

$$N = \left\lceil \frac{\sqrt{2}S}{2p} \right\rceil \quad (12)$$

Given a rotational acceleration time, $T_{AR}$, and maximum rotation speed v in the tangential direction along each circle, the concentric circle scan time, $t_R$, is given by $$t_R = \left(\frac{\sqrt{2}\pi S}{2v} + \frac{\pi p}{v} + T_{AR}\right) \cdot N \quad (13)$$

The acceleration time, $T_A$, might be a user determined value that is set in controller 302 of imaging system 300. In general, the magnitude of acceleration time is on the order of milliseconds, and the magnitude of motion time is on the order of seconds. Ignoring the acceleration time, the rotational scan time, $t_R$, given by (13), is π/2 (~1.57) times the translational scan time, $t_T$, given by (10), because the redundant scanning of blank areas (e.g., areas in FIG. 1 where scan trajectories 104 are not overlapping region of interest 102). Turnaround points 106 are reduced from 2$N_{lines}$−2 in raster scans to N for concentric circle scans (e.g., as shown in FIG. 1), approximately reducing the number of jerks by 65% as each turnaround point has two jerks (e.g., start and stop).

If region of interest 102 is circular, with a diameter of S, a raster scan will have the same scan area, number of scan lines, and scan time as if region of interest 102 was square, as described above. However, the radius, $r_{max}$, of the outmost circle (e.g., scan trajectory 104(N)) will be reduced to:

$$r_{max} = \tfrac{1}{2}S \qquad (14)$$

and the number of circles, N, required to scan the area with a given pitch, p, is given by:

$$N = \left\lceil \frac{S}{2p} \right\rceil \qquad (15)$$

and the concentric circle scan time, $t_R$, is given by:

$$t_R \cong \left(\frac{\pi S}{2v} + \frac{\pi p}{v} + T_{AR}\right) \cdot N \qquad (16)$$

Ignoring the acceleration time in (10) and (16), the rotation scan time, $t_R$, given by (16) is approximately π/4 (~0.785) times the translation scan time, $t_T$, given by (10). This yields a 21.5% decrease in scan time, since blank areas are not scanned. Turnaround points 106 are reduced from 2S/p−2 in raster scan to N in concentric circle scan, approximately reducing the number of jerks by 75%.

For a concentric circle scan having a constant angular velocity (CAV) of θ, the linear velocity, v, is given by:

$$v = r_R \cdot \dot{\theta} \qquad (17)$$

where $r_R$ is the circle radius where the linear velocity v can be achieved at the angular velocity $\dot{\theta}$. Then, the CCTS scan time, $t_R$, can be calculated as:

$$t_R = \left(\frac{2\pi}{\dot{\theta}} + T_{A\theta}\right) \cdot N \qquad (18)$$

where $T_{A\theta}$ is the CAV angular acceleration time. Substituting (15) into (18), gives the CCTS scan time, $t_R$, as:

$$t_R \cong \frac{\pi S}{\dot{\theta} p} + \frac{S}{p} T_{A\theta} \qquad (19)$$

Ignoring the acceleration time in (19), it is shown that when angular velocity $$\dot{\theta} = \frac{\pi v}{S},$$

the raster scan and the concentric circular scan trajectories will have the same scan time. If, however, angular velocity $$\dot{\theta} > \frac{\pi v}{S},$$

then the concentric circular scan is faster than the raster scan. A large region of interest 102 (e.g., a large S) will lower the criteria for θ in this inequality such that the larger the scan area, the faster the CAV circular scan. Such a conclusion is also applicable for the cases of scanning a rectangular region of interest. Note that the fast speed of large-area circular scan with CAV does not rely on highly frequent shifts between circles and hence avoids high-frequency resonance.

Established image processing techniques are most developed for Cartesian composite images where pixels are uniformly distributed along X and Y axes. To generate the images, rotational sample points Pare mapped to the Cartesian coordinates, and each pixel is generated by interpolating its neighboring sample points. The mapping error is the main cause of image distortion due to non-uniform sampled spatial positions in Cartesian coordinates. To reduce the distortion in the interpolated images, described embodiments optimize CCTS to achieve uniform sampling positions in Cartesian coordinates by applying neighborhood constraints on tangential motion and radial motion to maintain uniform Cartesian sampling positions. CCTS imaging might employ various interpolation methods, such as nearest-neighbor interpolation method or linear interpolation. Nearest-neighbor interpolation assigns to each query pixel the value of the nearest sample point; linear interpolation assigns to each query pixel the weighted values of its neighboring pixels.

Described embodiments employ CCTS for super resolution (SR) and mosaicing, respectively, to achieve high resolution imaging for large areas. For use in SR, described embodiments employ iterative backpropagation (IBP) to achieve sub-pixel resolution from relative motion of low resolution (LR) images. For use in mosaicing, described embodiments fuse (or stitch) limited FOV images to achieve one wide-view composite image. Homography matrices are actively generated for mosaicing, according to the known motion. The mosaics in the global coordinates are re-projected onto a synthetic manifold through rendering transformation. The unfolded manifold forms the overview of the scene. As the views are fixed to be rectangular to the scene, re-projection calculation is avoided.

Figure 4:
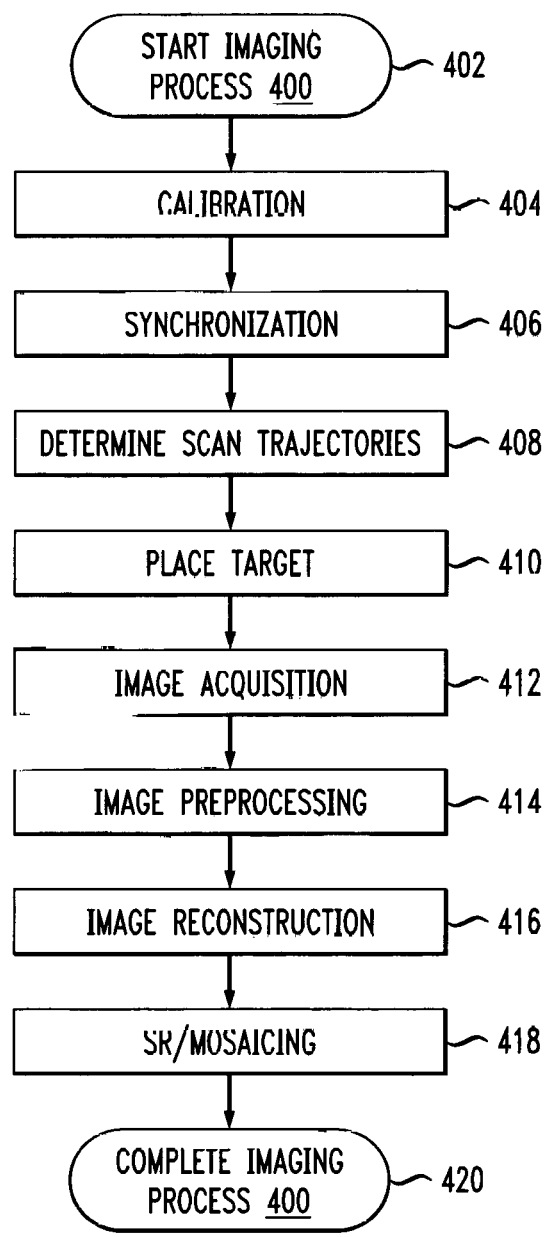
FIG. 4 is a flow diagram showing an illustrative imaging technique of the imaging system of FIG. 3.

Referring to FIG. 4, a flow diagram of imaging process 400 is shown for rotational scanning, for example by imaging system 300 of FIG. 3. At block 402, imaging process 400 begins. Since the working stage and the camera have independent coordinates, at block 404, camera calibration includes the registration of camera coordinates (e.g., of camera 306) and stage coordinates (e.g., of target support structure 320), and setting the illumination (e.g., by light source 304). To sample the motion of the stage in the scanned images, the stage coordinates are registered in the camera coordinates by aligning the camera and stage and registering the rotation center of the image. The magnification factor (MF) and illumination system might be customized during calibration.

At block 406, imaging system 300 is synchronized. For example, controller 302 coordinates the rotation speed of the stage (e.g., of target support structure 320) and frame-grab rate of camera 306 such that images are precisely acquired at predefined positions in the peripheral direction along all circles (e.g., scan trajectories 104). Controller 302 moves the stage along the radial direction to extend the FOV. When the stage moves to a desired position, camera 306 is triggered (e.g., by controller 302) to acquire an image.

Figure 5:
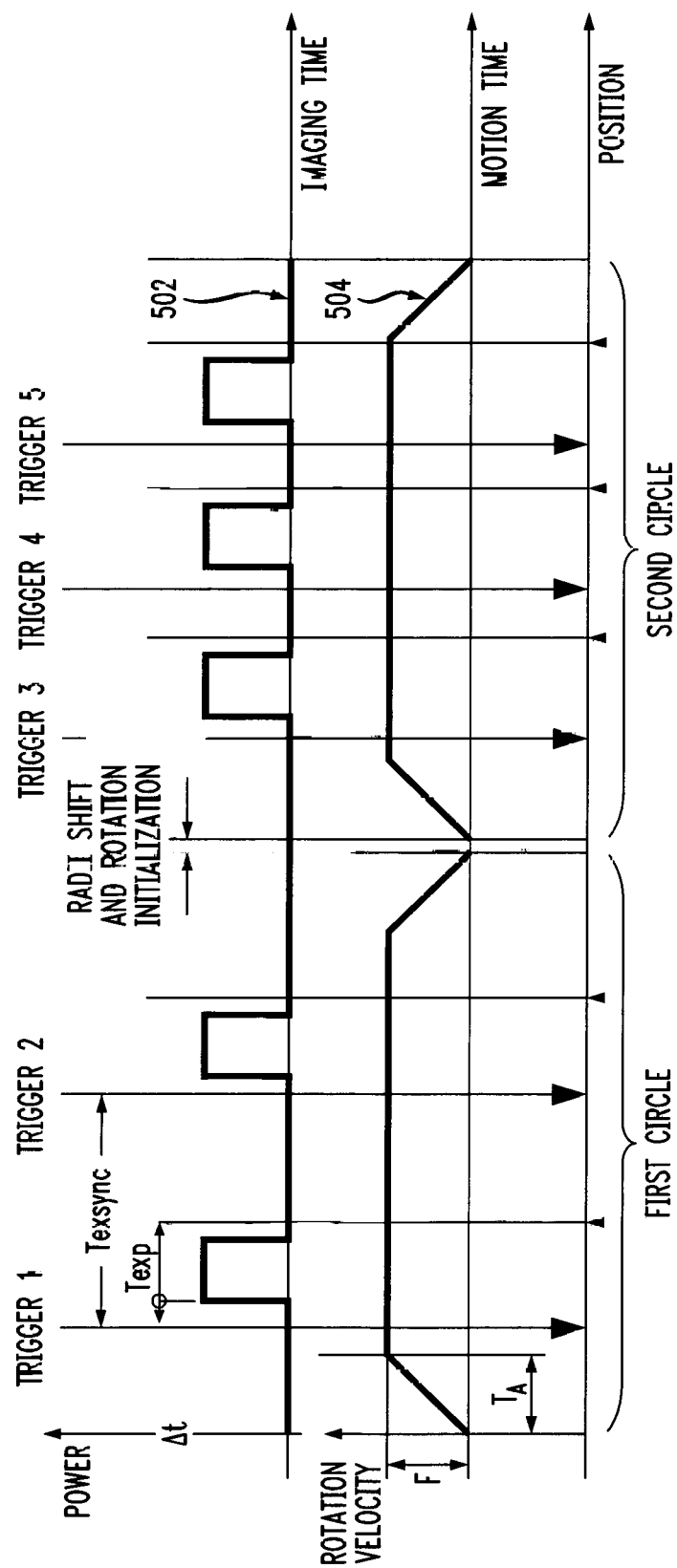
FIG. 5 is a diagram of a velocity profile of a scanning trajectory with imaging trigger timing in accordance with described embodiments.

Referring to FIG. 5, a timing diagram of synchronization and control of the CCTS imaging is shown. As shown in FIG. 5, the camera control signal takes time Δt to react to the trigger of the controller and the camera can achieve an exposure time, Texp, with a given frame rate. In an embodiment, Δt is approximately 1.3 ms, and Texp is 1996 μs with a frame rate of 500 fbs for the full region of interest. The sum of the maximum camera reaction time and the maximum exposure time is the upper bound of the frame time and lower bound of the trigger interval. Therefore, the trigger signals (e.g., curve 502) each start at a time interval of Texsync, which is larger than sum of the maximum camera reaction time and the maximum exposure time, to obtain reliable synchronous timing. The calculation of the maximum camera reaction time and the maximum exposure time reduces positioning errors.

Controller 302 controls the stages for circular rotation (e.g., curve 504) in a smooth way, although shifts are necessary for radii extension between concentric rings (e.g., scan trajectories 104). The acceleration and deceleration time is decreased for the shifts and initialization of next-circle rotation-start. As shown in FIG. 5, the camera trigger signal starts after acceleration completes, and image acquisition ends before deceleration starts in each circle (e.g., scan trajectory 104). Additionally, in described embodiments, the number of samples progressively increases with the radii of the circles (e.g., scan trajectories 104).

Given a CAV, acquiring all of the sample points in the outermost circle requires a minimum frame rate among all circles. Given a rotation speed ω at the outermost circle, the outermost circle rotation time, $t_{circle}$, is given by:

$$t_{circle} = \frac{\pi}{\omega} \quad (20)$$

The average effective sampling rate, $s_{rate}$, is given by:

$$s_{rate} = \frac{\text{\# samples}}{t_{circle} - 2T_A} \quad (21)$$

where $T_A$ is acceleration and deceleration time and # samples is the number of samples in the circle. Substituting (20) in (21) shows that $s_{rate}$ is given by:

$$s_{rate} = \frac{\text{\# samples}}{\frac{\pi}{\omega} - 2T_A} \quad (22)$$

Thus, to acquire all the samples in the outermost circle, the minimum frame rate, $f_{rate}$, should be faster than $s_{rate}$.

Referring back to FIG. 4, at block 408, scan trajectories 104 are determined to acquire an image of a region of interest of a target.

At block 410, the target is placed for image acquisition at block 412, where the stage is shifted and rotated for the camera to acquire one or more images (e.g., a plurality of images for mosaicing). In some embodiments, one camera pixel is employed to acquire four LR images for a target. For the same target, LR images vary from each other by regular distinct small angles. Such angular variations can be achieved by adding the small regular angles to the initial angle of each circle.

At block 414, image preprocessing is performed. At block 416, image reconstruction is performed. At block 418, SR and/or mosaicing is performed. For example, SR might be performed using IBP techniques. SR and mosaicing techniques will be described in greater detail below. At block 420, imaging process 420 completes.

In described embodiments, the imaging system might employ a maximum linear velocity of 20 mm/s and an acceleration/deceleration time of 4 ms. The maximum CAV is 720° per second with an acceleration/deceleration time of 24 ms. CLV is achieved via linearly blending and circularly interpolating the moves on the X and Y axes of X-Y translation stage 316. CAV is achieved via linearly interpolating the rotation around the Z-axis of the rotation stage. CAV concentric circle scanning limits acceleration and vibration to the X axis (e.g., to shift between scan circles) versus raster scanning or CLV concentric circle scanning where acceleration and vibration occur in both the X and Y directions.

When scanning an illustrative round target having a 3.2 mm diameter, under the above conditions, typical raster scanning techniques might experience six jerks for each scan line, where CLV concentric circular scanning experiences four jerks, while CAV concentric circular scanning experiences only one jerk. An illustrative raster scan might complete five scan lines of the illustrative target in 1.25 s, where an illustrative CLV circular scan might complete two circles in 1.1 s and an illustrative CAV circular scan might complete two circles in 1.68 s. CAV circular scans tend to take longer for very small scan areas. Given the same velocity and acceleration, both the raster and CLV scan times in each cycle increase with the increments of scan area size. In contrast, the CAV scan time remains the same for each cycle for any size of scan area. The vibrations of raster scans and CLV circular scans are typically dominated by fundamental low frequencies less than 10 Hz, while CAV circular scans have no significant fundamental frequencies. Moreover, CLV circular scans have more low-frequency accelerations (<100 Hz) because of varying linear accelerations and velocities of either the X or Y linear motor for a constant blended velocity in each cycle. The vibration magnitude in CAV circular scans is an order of magnitude smaller than the vibration in CLV circular scans and raster scans.

Figure 6A:
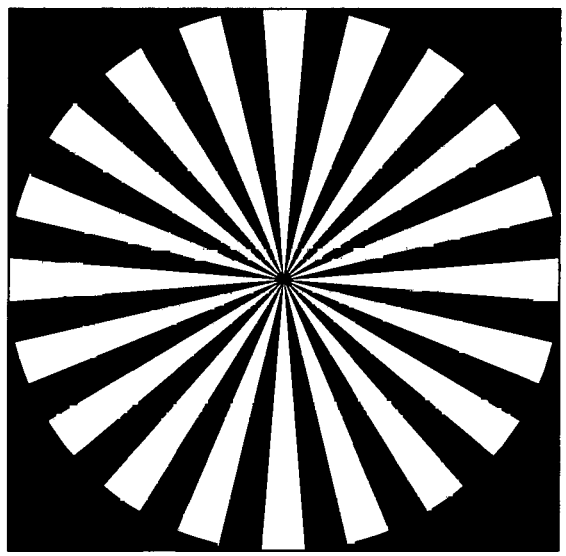
FIG. 6A is a diagram showing an illustrative target image.

Referring to FIG. 6, FIG. 6A shows a diagram of an illustrative synthetic star target to be scanned. FIG. 6B shows a diagram of the synthetic start target of FIG. 6A scanned by CAV circular scanning (e.g., CAV CCTS) and reconstructed using linear interpolation mapping. FIG. 6C shows a diagram of the synthetic start target of FIG. 6A scanned by CAV circular scanning and reconstructed using nearest-neighbor (NN) interpolation mapping. FIG. 6D shows a histogram of mapping errors for the reconstructed images.

Figure 6B:
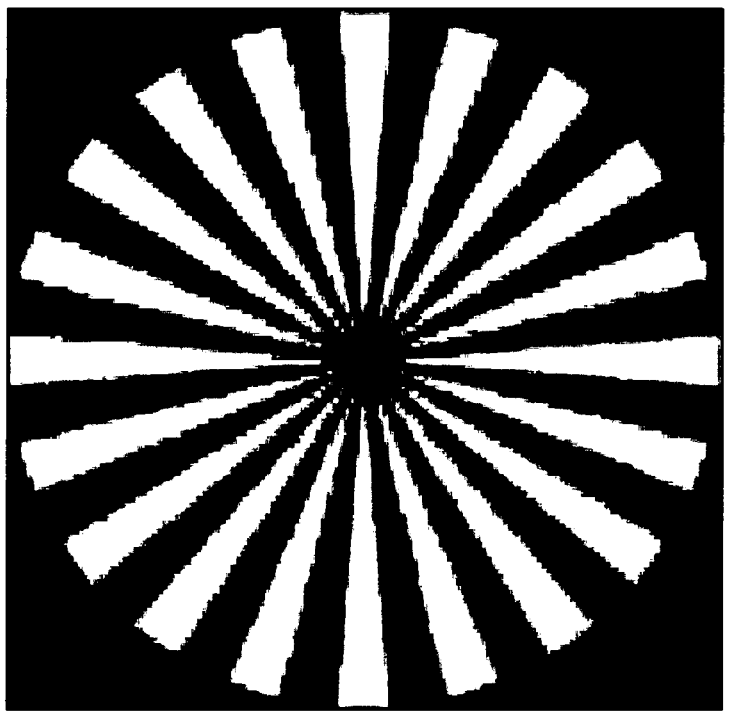
FIG. 6B is a diagram showing a linearly interpolated reconstruction of the target image of FIG. 6A after concentric circular scanning in accordance with described embodiments.
Figure 6D:
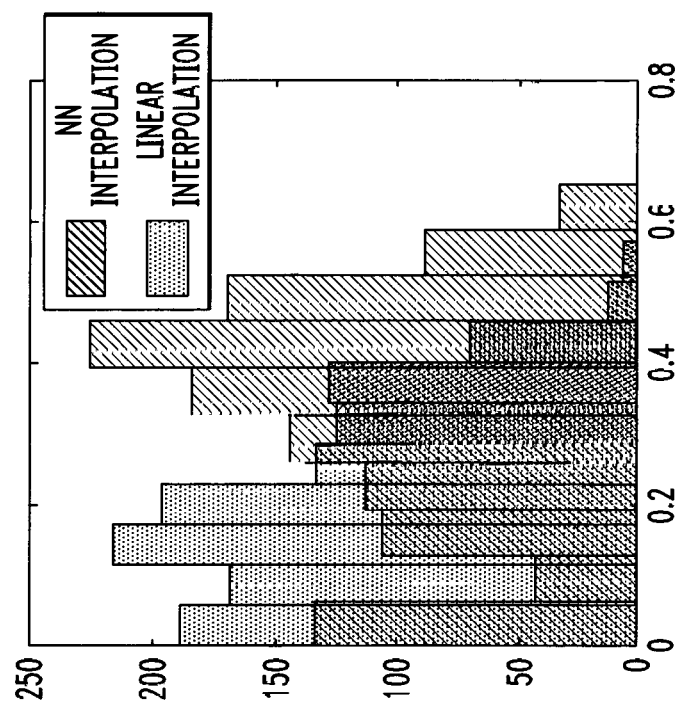
FIG. 6D is a diagram showing a histogram of the mapping errors of the reconstructed images of FIGS. 6B and 6C.
Figure 6C:
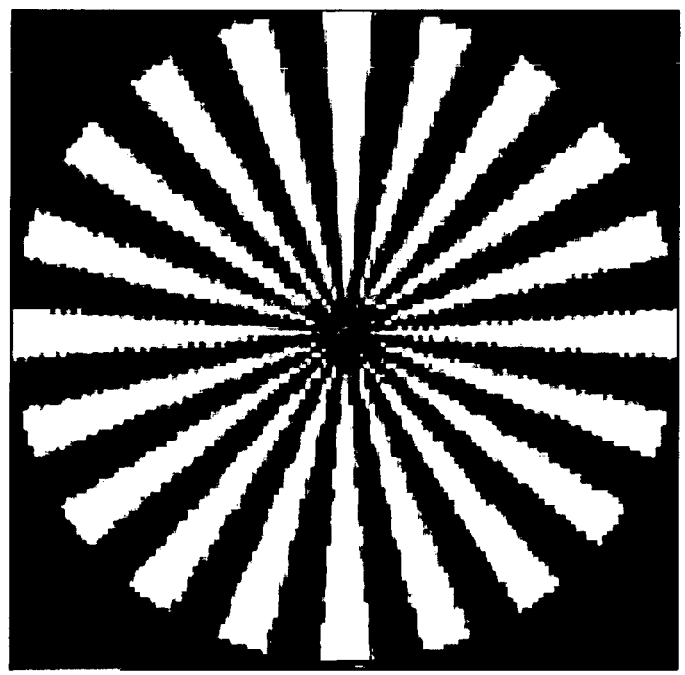
FIG. 6C is a diagram showing a nearest-neighbor interpolated reconstruction of the target image of FIG. 6A after concentric circular scanning in accordance with described embodiments.

The error introduced by mapping the concentric circular sample points into Cartesian coordinates is evaluated. In FIG. 6A, synthetic star target 600 is a 500×500 pixel image. A 4×4 average window simulates a pixel of an average filter that scans the target using CCTS. FIGS. 6B and 6C show the mapping results (125×125 pixels) using linear interpolation mapping (reconstructed image 602 of FIG. 6B), and NN interpolation mapping (reconstructed image 604 of FIG. 6C). The histograms of mapping errors shown in FIG. 6D quantitatively demonstrate that linear interpolation mapping has significantly lower errors than NN interpolation mapping. Thus, described embodiments might desirably employ linear interpolation for Cartesian image reconstruction. Described embodiments achieve sampling points having optimized uniform distribution of influence areas (e.g., as could be shown by a Voronoi diagram or a dual diagram of Delaunay Triangulation).

Figure 7:
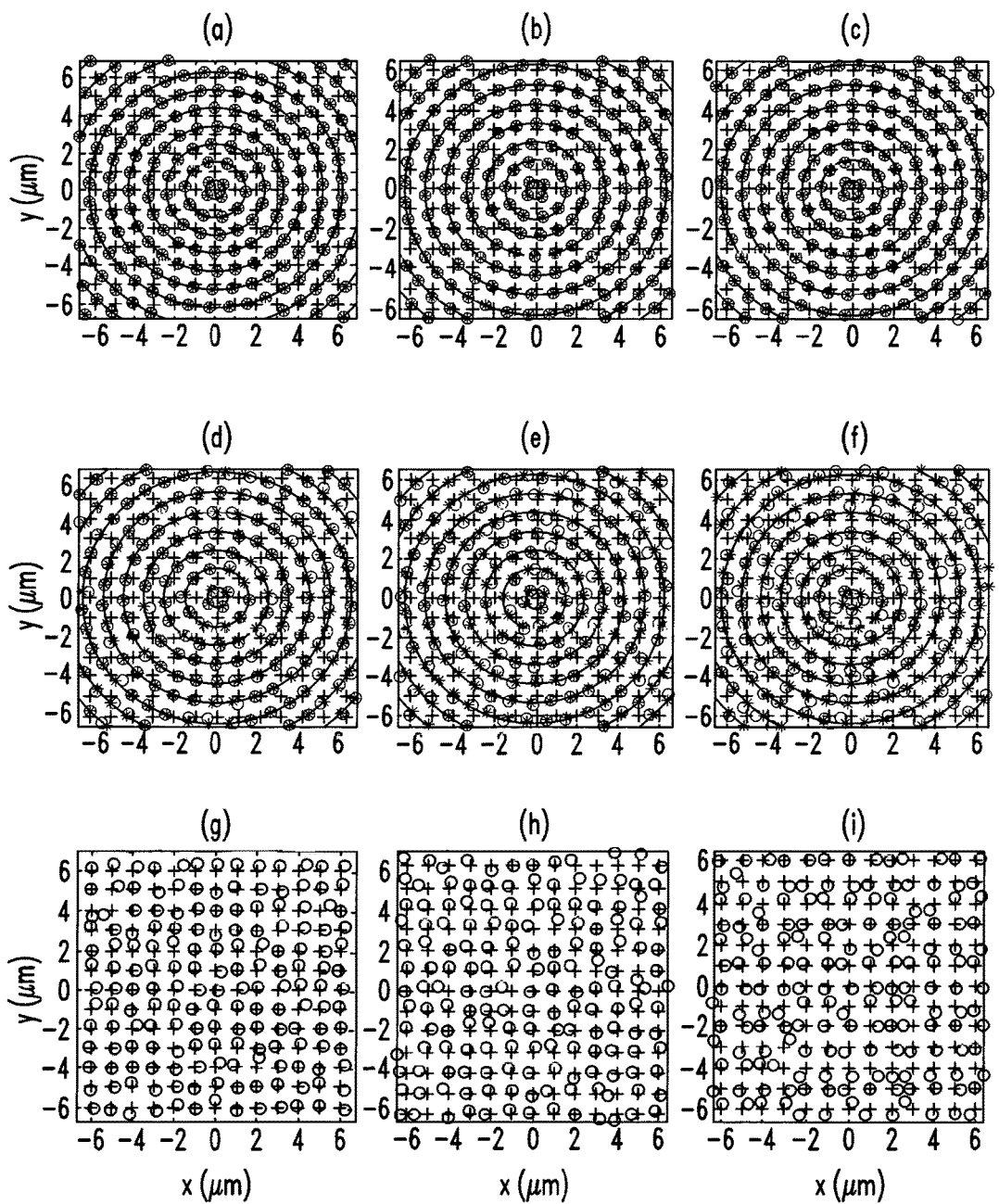

Referring to FIG. 7, the mapping errors and imaging time are evaluated for high-speed tracking of CAV CCTS and raster scans for a round target with a diameter of 4.578 mm. The buffer size of frame grabber and memory of the controller also limit the frame size and frame numbers. Thus, the required minimum frame rates as given by (22) can be calculated for images of a given pixel size. For example, in some embodiments, the minimum frame rates are, respectively, 70 fbs, 325 fbs and 715 fbs for ω=20°/s, 90°/s, and 180°/s, as shown in table 2 for images of 480×480 pixels.

FIGS. 7(a)-7(f) demonstrate the sampling CCTS trajectories between ±6 μm for ω=20°/s, 4°/s, 90°/s, 180°/s, 360°/s, and 720°/s, with a pitch p=1 μm. Solid lines and '*' are respectively the desired CCTS trajectories and sample positions, and 'o' and '+' are the achieved sample position and Cartesian coordinates. The sampling points and desired points match accurately up to ω=360°/s. To compare the mapping accuracy, FIGS. 7(g)-7(i) illustrate the raster scanning trajectories between +6 μm for v=0.5 mm/s, 2 mm/s, and 4 mm/s. For these various linear velocities, little difference can be visualized between their mapping errors. To quantitatively evaluate the performance of CCTS scans, the root mean square (RMS) errors, $E_{RMS}$, between the desired and achieved CCTS trajectories are calculated, as shown in table 2. The mapping errors are generated when interpolating the sampling points to create a Cartesian composite image. Hence, for NN interpolation, the NN mapping errors ($E_{NN}$) are measured by calculating the Euclidean distance between the image Cartesian coordinates and their corresponding NN sampling point positions. For linear interpolation, the linear mapping errors ($E_{LINEAR}$) are measured by a spatial variation cost function.

Table 2 shows that $E_{RMS}$ increases as CCTS rotation speed increases (e.g., due to eccentricity and wobbles). Nevertheless, $E_{RMS}$ remains relatively low compared to the mapping errors, $E_{LINEAR}$ and $E_{NN}$ of CCTS. The mapping errors of raster scans have not shown advantages over CCTS scans because motion stages have accuracies of 1. μm per 100 mm of travel. For each raster scanning speed in table 2 (e.g., v=0.5, 2, and 4 mm/s), the corresponding CCTS scanning speed can be calculated to achieve a similar scanning time (e.g., ω=19.66°/s, 39.32°/s, and 176.93°/s).

TABLE 2

| Raster Scans | | | | CAV CCTS Scans | | | | |
| --- | --- | --- | --- | --- | --- | --- | --- | --- |
| v (mm/s) | $E_{LINEAR}$ (μm) | $E_{NN}$ (μm) | $T_{TOTAL}$ (s) | ω (°/s) | $E_{RMS}$ (μm) | $E_{LINEAR}$ (μm) | $E_{NN}$ (μm) | $T_{TOTAL}$ (s) |
| 0.5 | 0.2503 | 0.4192 | 1932 | 20 | 0.0210 | 0.1698 | 0.3323 | 1824 |
| 2.0 | 0.2535 | 0.4430 | 483 | 90 | 0.0773 | 0.1712 | 0.3364 | 456 |
| 4.0 | 0.3050 | 0.3833 | 242 | 180 | 0.1152 | 0.1745 | 0.3332 | 228 |

The performance of CAV CCTS in generating images is investigated by scanning the 1951 U.S. Air Force resolving power test target (MIL-STD-150A). An illustrative version of MIL-STD-150A test target 800 is shown in FIG. 8. As shown, test target 800 includes six groups each having six elements. The number of lines per millimeter increases progressively in each group, and doubles every six target elements. For instance, the first and sixth elements of group 6 have respectively 64 and 114 lines per millimeter. In other words, the widths of lines in group 6 decrease from 7.8 μm to 4.4 μm.

Figure 9:
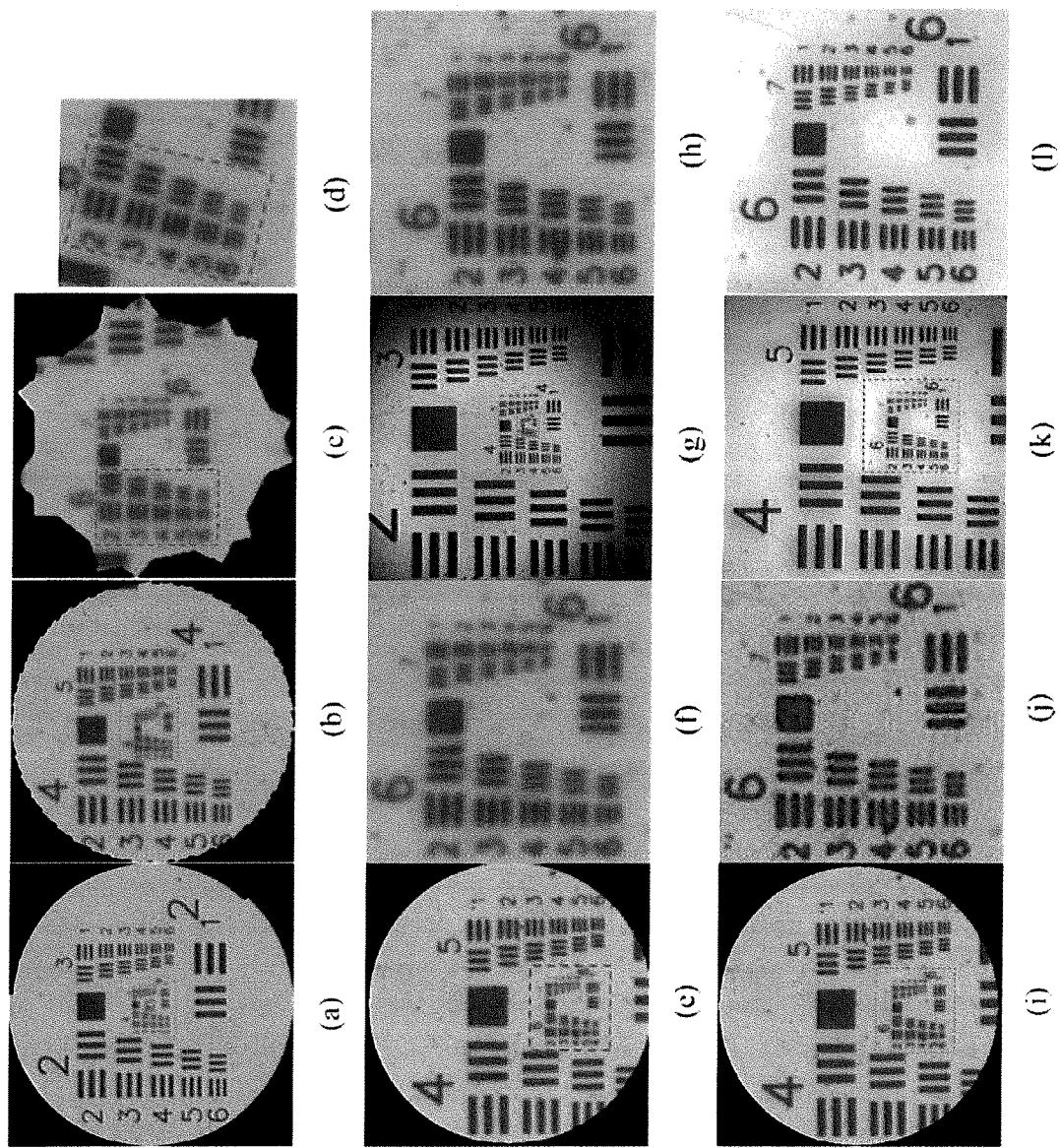

Referring to FIG. 9, mosaicing and SR image reconstruction of CAV CCTS scans are compared to the conventional image based on pixel arrays for evaluation. CAV rotation speed of 180°/s. In particular, FIG. 9(a) shows stitching 2971 10× images of groups 2-7 in test target 800 (the 7th group being the highlighted group in the center of FIG. 9(a)). FIG. 9(b) shows stitching 148 10× images of the 4th-7th groups in test target 800. FIG. 9(c) shows stitching 7 10× images of the 6th and 7th test target 800. FIG. 9(d) shows one 80×64 image patch for stitching that includes the 6th group test target 800. FIG. 9(e) shows concentric circle sampling and mosaicing of 70483 10× pixels of test target 800. FIG. 9(f) shows a zoom-in of the highlighted region of FIG. 9(e). FIG. 9(g) shows one 1024×1024 10× image of test target 800. FIG. 9(h) shows a zoom-in of the highlighted region of FIG. 9(g). FIG. 9(i) shows SR (interpolation factor=2) using four mosaicked 10× images acquired by CCTS. FIG. 9(j) shows a zoom-in of the highlighted region of FIG. 9(i). FIG. 9(k) shows a 20× image of groups 4-7 in test target 800. FIG. 9(l) shows a zoom-in of the highlighted region of FIG. 9(k).

FIGS. 9(a)-9(f) show illustrative stitching and mosaicing results of CCTS scans of test target 800. The positioning of each sampled patch is controlled and the rotation is started at the target center. In an illustrative embodiment, the patch size is 80×60 pixels for stitching. Radii of the scan trajectories increment in steps of 30 pixels. Sequential images are then projected on a global coordinates system (e.g., by backward-projection that interpolates the newly generated stitching images when every image is added). As shown in FIGS. 9(a)-9(c), the stitched images have more blurry effects in the center regions. However, as shown in FIG. 9(e), mosaicked images have no such uneven sharpness problem with the image size growing. FIGS. 9(e) and 9(f) also demonstrate that the concentric circular mosaicked images include high-frequency features as detailed as those acquired by large sensor cameras of similar resolution (FIGS. 9(g) and 9(h)), while FIG. 9(a) demonstrates that the stitching process can achieve as many features as larger sensor cameras (FIG. 9(g)).

Moreover, FIGS. 9(i) and 9(j) demonstrate the SR results of FIGS. 9(e) and 9(f). FIG. 9(f) highlights the high-frequency-missing ROI in the LR images. The HR image in FIG. 9(k) is acquired using 20× lenses such that the corresponding peak frequencies in FIG. 9(l) can be acquired as references. Described embodiments employ a 3-sigma Gaussian white noise model for SR. The SR result shows smoothness, high-resolution and de-aliasing effects. As shown in FIG. 9(i), the high frequencies (as shown in FIG. 9(j) are partially recovered using IBP-SR techniques. As highlighted in FIG. 9(j), all the elements in group 6 and the first two elements in group 7 are recovered with the achievable resolution of 3.5 μm at the second element of group 7. Meanwhile, those elements' labels have distinctive patterning in the SR image, though they appear smeared and coarse in FIG. 9(f). Thus, described embodiments can combine SR algorithms to reconstruct HR patterns for imaging without increasing hardware cost of the imaging system (e.g., requiring a larger sensor camera).

Described embodiments implement a concentric circle trajectory scan for high-resolution and large-area imaging that reduces vibration in scanning, and overcomes the tradeoff limitation between resolution and FOV in conventional imaging systems by using CCTS and mosaicing. CAV CCTS scanning exhibits advantages over CLV scanning, such as easy control, speed and low vibration, especially for large sample areas. Given a sufficient rotation radius, the CAV scan solves the conventional problem in raster scanning wherein the scan speed is limited by the linear motor's speed and the scanner's resonance frequency. In addition, mosaicing and SR images are achievable using high-speed LR area scanners in conjunction with CCTS scanning.

SR image reconstruction (e.g., block 418 of FIG. 4) uses subpixel overlapping LR images to reconstruct a high-resolution (HR) image. Conventionally, motion estimation is essential for SR techniques, since poor motion estimation and subsequent registration, for example, a low signal-noise ratio (SNR), can cause registration errors, leading to edge jaggedness in the SR image and hampering the reconstruction of fine details. Applying a regular shift (RS) to SR, for example based on the generalized sampling theorem (GST), provides a known motion that can eliminate registration errors and reduce computational complexity in SR. The RS of LR images indicates a forward formation matrix where the larger determinant of the matrix results in lower noise amplification. Regular sub-pixel shifts of the LR images can solve the maximization of the determinant for weakly regularized reconstructions by formulating the aliasing as the combination of frequency sub-bands that have different weights in each LR image. The LR images are merged and de-convolved in a finer grid.

As described herein, concentric circular scanning can achieve an approximately uniform intensity-distribution in Cartesian coordinates, and thus reduce image distortion. Described embodiments regularize concentric circle sampling and incorporate radial motion into SR image reconstruction. Described embodiments also incorporate de-blurring and de-noising of the SR frame.

Referring to FIG. 10, a flow diagram of SR technique 1000 is shown. For example, SR process 1000 might be performed at block 418 of imaging process 400. At block 1002, SR process 1000 begins. At block 1004, a target image is divided into a number of rings with their respective radii based on the sampling algorithm. At block 1006, blurring and noise effects in each ring are reduced (or, ideally, eliminated) by performing truncating singular value decomposition (SVD). At block 1008, low resolution (LR) images of every ring of the target image are processed by iterative backpropagation (IBP) for super resolution (SR). Processing at blocks 1006 and 1008 occurs in polar coordinates for each ring separately. At block 1010, the SR image in every ring is transformed from polar to Cartesian coordinates. At block 1012, the SR images of every ring are stitched into a complete SR image.

Shift-based SR methods acquire LR images by regularly shifting with respect to the target in sub-pixel steps. Given an image $I(\rho, \theta)$ in HR polar coordinates, LR pixels are acquired on equidistant spacing grids in radial and angular dimensions. Using radial resolution $\Delta\rho$ and angular resolution $\Delta\theta$, the LR image formation process is given by:

$$\hat{I}(\rho,\theta) \triangleq \Sigma_{m=0}^{M} \Sigma_{n=0}^{N} I(\rho,\theta) \cdot \delta(\rho - m \cdot \Delta\rho - n \cdot \Delta\theta) \quad (23)$$

where $\delta(\rho, \theta)$ is the 2-D Dirac-impulse function, and M and N are the LR-pixel size measured by integer HR pixel numbers in radial and angular dimensions.

RS sampling requires a regular spacing array so that the basis unit in each dimension can describe one integer shift (e.g., radial resolution $\Delta\rho$ and angular resolution $\Delta\theta$) in (23) above. In described embodiments, the number of sampling points for each concentric circle (e.g., scan trajectories 104) in the angular direction depends on the sampling in the radial direction. Such sampling does not provide an obvious regular spacing array for SR images. For example, the Voronoi algorithm can divide the sampling area by ideal LR pixels, but the ideal pixels have irregular shapes and different sizes in radial dimension. Moreover, the numbers of LR pixels vary in rings. These irregularities of LR image pixels hamper the implementation of CTS for SR. However, dividing each ring uniformly in angular and radial dimensions results in a star-sector-shaped base. Regularly shifting the primary sampling points along the radial direction in sub-rings, and rotating the points in the same speed in each ring allows for conventional SR techniques ring by ring.

Described embodiments employ three coordinate systems in the SR process, including continuous polar coordinates (CPC) $(\rho, \theta)$, discrete LR polar coordinates (LPC) $(u, v)$, and discrete HR polar coordinates (HPC) $(\xi, \theta)$. HPC is an intermediate coordinate system that is assumed for the SR image in Cartesian coordinates. Each LPC pixel $(u, v)$ covers a radial sector area of CPC. Then, the CPC radial sector area is projected to the LPC pixel $(u, v)$ by:

$$g(u,v) = \int_{u-\Delta\rho/2}^{u+\Delta\rho/2} \int_{v-\Delta\theta/2}^{v+\Delta\theta/2} (u-\rho, v-\theta) \cdot I(\rho,\theta) \, d\rho d\theta + n(u,v) \quad (24)$$

where $PSF(\cdot)$ denotes the blurring function centered at the coordinates $(\cdot)$, and $I(\rho, \theta)$ is the CPC image, and $n(u, v)$ is the noise centered at $(u, v)$. Assuming an HPC image $H(\xi\eta)$ has a coordinate transformation with the CPC image $I(\rho, \theta)$, has a constant value in each HR pixel, the HPC image presents the LPC image by:

$$g(u,v) = \int_{u-\Delta\rho/2}^{u+\Delta\rho/2} \int_{v-\Delta\theta/2}^{v+\Delta\theta/2} PSF((u,v)-s(\xi\eta) \cdot I(s(\xi\eta))) d\xi d\eta + n(u,v) \quad (25).$$

In the case of in-plane rotation, assuming each LR pixel covers a sector area of m*n HPC pixels, (25) can be transferred discretely by:

$$g(u,v) = \Sigma_{u-m*\Delta\rho/2}^{u+m*\Delta\rho/2} \Sigma_{v-n*\Delta\theta/2}^{v+n*\Delta\theta/2} PSF((u,v)-s(\xi,\eta)) \cdot H(\xi,\eta) + n(u,v) \quad (26).$$

The HR pixel response in equation (26) is the accumulation of irradiance in the HR pixel area. Described embodiments remove the blurring effect and noise from the LR pixels, and up sample the LR image. The IBP algorithm is applied to the de-blurred and up-sampled pixels to achieve the HR pixel value. As the whole image is broken into smaller-sized ring-shape sub-images, truncated SVD is employed to restore noisy and linearly degraded LR images without large matrices. In some embodiments, truncated SVD is implemented with a fast Fourier transform (FFT).

Figure 11:
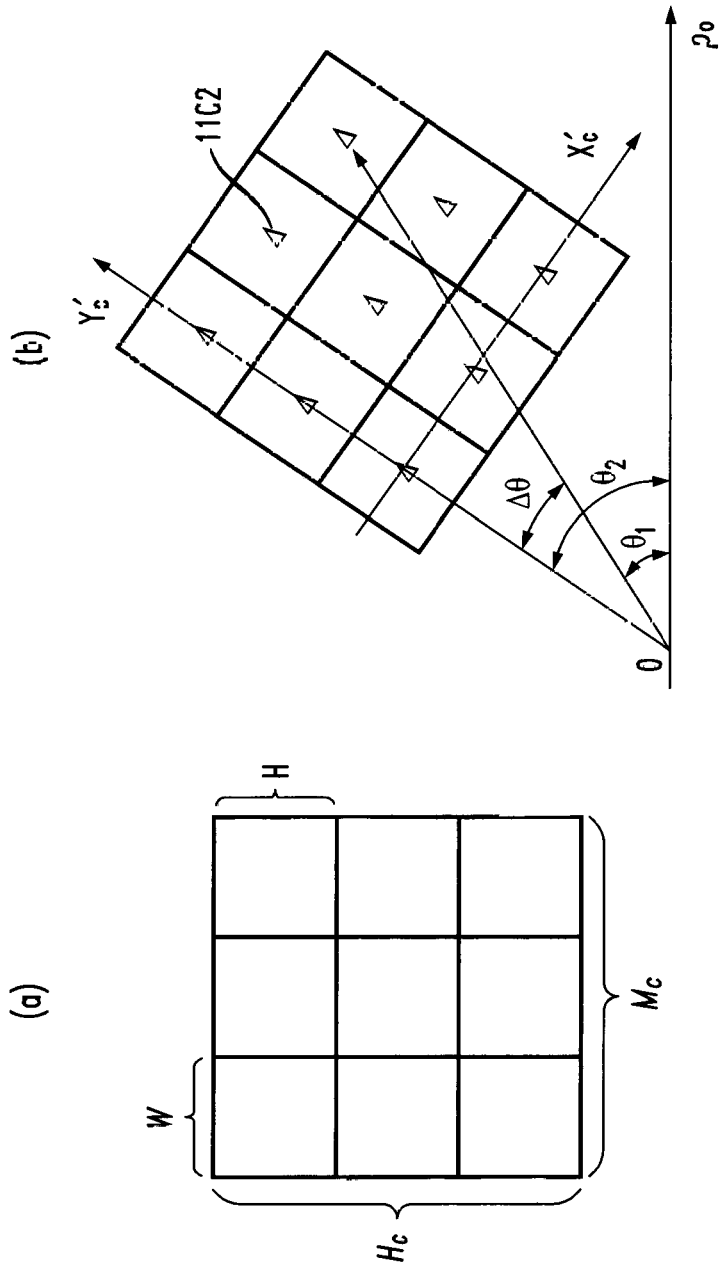

When a camera rotates, the relative positions between the camera pixels remain rigid. FIG. 11 shows a camera with a size of (Mc, Nc) pixels, and a pixel resolution of W×H. The camera has a local Cartesian system X', Y'. Duplex integers i and j, where i=1, . . . MC and j=1, . . . Nc, to each camera pixel to denote its index in the camera's local Cartesian coordinates system $X_c'$, $Y_c'$. The center of each pixel $\{Q\}$, indicated by solid triangle 1102, can be described by its four corners. Each corner of the camera pixels has polar coordinates registered by the coordinates X', Y' and the motion of the camera. If $\overline{OQ_{i,j}} = \rho_{i,j}$, polar coordinates can be assigned to the camera pixels by:

$$\rho_{i,j} = \sqrt{(\rho_{i,j} + (i-1)H)^2 + ((j-1)W)^2} \quad (27)$$

$$\theta_{i,j} = \theta_1 - \tan^{-1}(((j-1)W)/(\rho_{i,j} + (i-1)H)) \quad (28)$$

For any of the one-pixel-sampling points, the pixel (i, j) shifts $(\Delta\rho_{ij}, \Delta\theta_{ij})$ from pixel $(1, 1)$. Each camera pixel can thus be allocated into the local polar grids transformed from the X', Y' coordinates. We approximate the shifts of each camera pixel in the radial and angular dimensions of the global polar coordinates by the relative shifts of the camera pixel in the X', Y' coordinates.

For each sampling ring, the camera rotates on K circles to sample the HR image. The array pixels generate M*N sub-ring shaped sampled LR images. For each sub-ring, the LR images are sorted by the order of $\Delta\rho_{ij}$, $\Delta\theta_{ij}$. To use the array of camera pixels for LR pixels, the regular shifts by radial resolution $\Delta\rho$ and angular resolution $\Delta\theta$ are defined in the polar grids of LR or HR images in advance. The shifts of LR are generally functions of the HR pixel size. For a rectangular camera, its pixels having both radial and angular coordinate shifts near the regular integer shift for SR. Gradient can be used to find the regular shifts in Polar grids.

Described embodiments employ an SR technique that uses RS in rotational sampling to reduce registration computation load, and improve SR accuracy. The RS scanning results in small LR sub-images are suitable for truncated SVD in de-blurring and de-noising. This allows resolution discrimination ability in radial and angular dimensions. The extended algorithm for cameras improves the sampling efficiency for SR. Ring-shaped sub-images are sampled and reconstructed independently, which offers SR scalability and flexibility for any field of view.

Described embodiments sample sequential low-resolution (LR) images using available low cost image sensors. The LR images are then fused into a single composition of superior quality and enlarged FOV using super-resolution (SR) and image mosaicing techniques. Advances in fast frame grabber technology further motivate the development of the aforementioned techniques. Owing to its inexpensive cost, such a solution has ubiquitous applications in diverse fields including machine vision, medical imaging, remote sensing and astronomy, video image compression and reconstruction, and surveillance.

SR techniques use the aliasing variation in the overlapped areas among LR images to extract high frequencies. The LR images are assumed to be the sampling results of an HR image with respect to an image formation model; the SR image is assumed to be the reconstruction result of the LR images by reversing the image formation model. Between the LR images, relative sub-pixel motion exists such that their overlapping areas have aliasing variations. Generally, the LR images are projected in the presumed HR lattice, a common reference frame. SR techniques attempt to discover the embedded state of HR coordinates that can construct the aliasing variation in the image formation model. Hence, the success of SR techniques depends on the accuracy of both image registration and reconstruction algorithms. Poor registration can degrade the SR result if erroneous motion information is used.

Image registration primarily refers to the motion estimation or active motion control of a whole LR image. The former registration method suffers from errors induced by low signal-to-noise ratio (SNR) and a theoretical lower bound, as well as computational cost. The latter registration method can readily provide accurate sub-pixel relative motion for image reconstruction, given a reliable motion-control algorithm. Translational raster sampling has simple image post-processing, such as interpolation and stitching, because conventional images have square pixels uniformly distributed spatially in Cartesian coordinates and sampling is performed parallel to image coordinate axes.

However, translational sampling has disadvantages in many SR applications. First, translational sampling results in strictly lateral variations between LR images, limiting the recovery of high frequencies in other dimensions (e.g., HR patterns in angular-dependent features). Second, translational sampling induces net artifacts in the SR image. Third, the frequent acceleration in back and forth translation generates vibration that can degrade the scanned images or decrease the scanning speed due to additional settling time. For example, the sharp turnaround points in the raster trajectory often induce mechanical vibrations of the nano-positioner of scanning microcopies and may severely affect the positioning precision such that the reconstructed image is degraded and distorted.

As described herein, concentric circular scanning trajectories can reduce vibration by smoothing or reducing the turnaround points. Distortion errors caused by the transformation between non-Cartesian sampling coordinates and Cartesian image coordinates are reduced (or, ideally, eliminated) by using optimized concentric circular trajectory sampling (OCCTS). Ideal sampling trajectories have sampling points aligned with or equidistant to the interpolation coordinates. OCCTS trajectories can rotationally sample pixels in a Cartesian composite image as uniformly as possible while enabling high speed and scalable coverage. These advantages allow the sampling method to be used for both SR and mosaicing.

Generally, Cartesian coordinates (x, y) can be represented by the polar coordinates ($\rho$, $\theta$) as $x=\rho\cdot\cos\theta$ and $y=\rho\cdot\sin\theta$. If rotational sampling starts at coordinates $(x_0, y_0)$ or $(\rho_0, \theta_0)$ and ends at the sampling coordinates (x, y) with a rotation of $\Delta\theta$, then, $\theta=\theta_0+\Delta\theta$. Thus, $x=\rho\cdot\cos(\theta_0+\Delta\theta)$, $y=\rho\cdot\sin(\theta_0+\Delta\theta)$, $x_0=\rho\cdot\cos(\theta_0)$, and $y_0=\rho\cdot\sin(\theta_0)$, where the rotation angle $\Delta\theta$ can be expressed in terms of sampling parameters by the angular speed $\omega$ and the time interval between samples $\Delta t$, as $\Delta\theta=\omega\cdot\Delta t$. The motion along the X axis, $\Delta x$, can be transformed to polar coordinates as $\Delta x(\rho,\theta)=\rho(\cos\theta-\cos(\theta-\Delta\theta))$.

FIGS. 12(a)-(c) show diagrams of Cartesian coordinates in circular sampling. FIGS. 12(a) and 12(b) show inter-conversion between polar coordinates and Cartesian coordinates, and FIG. 12(c) shows rotational samples in the neighborhood of a Cartesian coordinate. FIG. 12(c) shows a uniform rectangular-grid distribution in Cartesian coordinates and the projection of the above rotational motion in Cartesian coordinates. The intersection of the orthogonal lines denotes the corner of Cartesian target cells. Described embodiments achieve a uniform distribution of rotational sampling positions in the Cartesian cells. The sampling result is interpolated to create a Cartesian composite image.

Interpolating an image in Cartesian coordinates requires sufficient rotational sampling sites. Given any Cartesian coordinate $(x_{ix}, y_{iy})=(ix\times dX, iy\times dY)$, where ix and iy refer, respectively, to the coordinate indices, and dX and dY are, respectively, the cell sizes along the X and Y axes, neighboring sampling points are those that are contained within the four neighboring cells. For example, in FIG. 12(c), four neighboring cells form a $2dX\times 2dY$ neighborhood that includes three sampling points. The optimized rotational sampling objective can be stated as $\min(f(N(x_{ix}, y_{iy})))$, where N denotes the sampling points in the four neighbor cells and $f$ denotes a statistical function that can evaluate the spatial variation of the sampling neighbor points around all Cartesian coordinates of the image. For example, $f$ might be given by:

$$\sqrt{\frac{\sum\left((var_x(ix,iy)-\overline{var_x(\cdot)})^2+(var_y(ix,iy)-\overline{var_y(\cdot)})^2\right)}{(ix)\cdot(iy)}} \quad (29)$$

where (·) denotes the count operator, and the metrics $\text{var}_x(ix, iy)$ and $\text{var}_y(ix, iy)$ measure the symmetricity variation of neighboring sampling points, respectively, about the coordinates $y_{iy}$ and $x_{ix}$. Such a metric design accounts for the symmetrical and separable interpolation kernels used generally in image processing: interpolation is performed in the X direction first, and the resulting intermediate points are used for the interpolation in the Y direction.

For example, bilinear interpolation weighs a point's neighbors by their distances to that point. In FIG. 12(c), $\text{var}_x$ and $\text{var}_y$ are the deviations of the sampling mass center 1204 of the neighboring points from the desired Cartesian coordinate 1202. Minimizing $f$ brings the mass center of the neighboring sampling points as close as possible to its respective Cartesian coordinates and achieves a global spatial distribution of sampling points as uniform as possible for the whole Cartesian composite image.

To maintain a sufficient and non-redundant neighborhood, described embodiments constrain angular motion and rotational motion. First, the neighboring rotational positions are constrained to be in the neighboring Cartesian cells by $|\Delta x(\rho, \theta)| \leq dX$, assuming the pixel sizes are equal along both the X and Y axes. Since rotational and translational motions are both mirror symmetric, the description of the constraint on motion along the Y axis is analogous to the constraint on the X axis. The maximum motion along the X axis, $|\Delta\Delta x|$ occurs at $\theta=(\pi+\Delta\theta)/2$. Thus, $|\Delta x(\rho, \theta=(\pi+\Delta\theta)/2)|=2\rho\cdot\sin(\Delta\theta/2)$. Further, $\Delta\theta=\omega\cdot\Delta t \leq 2\sin^{-1}(dX/2\rho)$. The maximum angular speed is $\omega_{max}=2\sin^{-1}[(dX/2\rho)/\Delta t]$. The number of samples N on the $\rho$-radius rotation in one period is thus given by:

$$N = \left[\frac{2\pi}{\omega_{max} \cdot \Delta t}\right] \quad (30)$$

where [·] refers to the integer operation. Using the above integer number of samples N, the rotation speed is given by:

$$\omega_{max} = \frac{2\pi}{N \cdot \Delta t}. \quad (31)$$

The maximum angular speed $\omega_{max}$ approaches $dX/(\rho\cdot\Delta t)$ as the radius increases. The ideal number of samples along any ring circumference is thus $N=2\pi\rho$. This gives a tangential sampling density (TSD) of $N/\rho \approx 2\pi$, where TSD is the number of samples N in a ring divided by the radius p of that ring.

Given an initial rotation angle and radius pair, (30) and (31) can determine the number of samples and position in any one ring (e.g., scanning trajectory), where a ring refers to a constant radius single cycle rotation starting and ending at the same angle. The internal angles between neighboring samples in one ring can be determined by the Cartesian-pixel size and the radius of the ring. In practice, the Cartesian-pixel size is determined by the scanner resolution.

Figure 13:
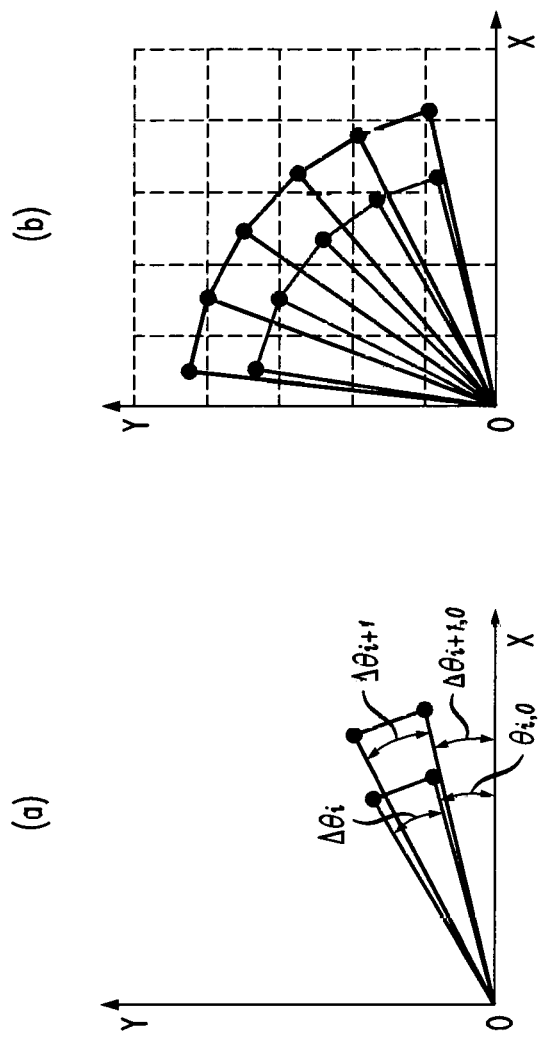

FIG. 13 shows an illustrative interrelationship between two neighboring sampling rings. Ring i and ring i+1 are shown having an initial rotation angle, which is the polar angle of the first sampling position, and unique radii. As shown in FIG. 13(a), $\theta_{i,0}$ and $\theta_{i+1,0}$ denote the initial rotation angles of ring i and ring i+1, respectively, and $\Delta\theta_i$ and $\Delta\theta_{i+1}$ denote the sampling intervals of ring i and ring i+1 in angular motion, respectively.

To regularize the rotational sampling without loss of generalization, initial rotation angles are smaller than or equal to the angular sampling interval. To confine neighboring initial sampling positions in neighboring Cartesian cells, the following two constraints can be imposed:

$$0 \leq \rho_i \cdot \sin(\theta_{i,0}) \leq dY \quad (32), \text{ and}$$

$$(i-1) \cdot dX \leq \rho_i \cdot \cos(\theta_{i,0}) \leq i \cdot dX \quad (33)$$

In the above, (32) bounds the initial sampling points in the first row of Cartesian cells above the X axis, while (33) bounds the initial sampling points of each ring in Cartesian cell columns. The constraint in (31) guarantees that the rotational sampling scans the Cartesian grid at the maximum angular speed while preserving the Cartesian-coordinate neighborhood distribution. However, the above three constraints alone cannot guarantee that all of the cells are scanned when we extend the radius to external rings, since they are slack in radii calculation for rings. In addition, the constraint on sampling positions other than the initial position needs to be tightened. Thus, some embodiments might also introduce a pixel area coverage constraint to tighten the sampling in the radial direction. The radial sampling positions are confined ring by ring such that the scanned target is covered as completely as possible by the sampling sensor pixel.

FIG. 14 shows the i−1th ring 1402 and the ith ring 1404 around a predefined global rotation center 1406. Boxes 1408(1) and 1408(2) represent sampling pixels on the i−1th ring and box 14010 represents sampling pixels on the ith ring. The i−1th ring with radius $\rho_{i-1}$ defines the trajectory of the sampling pixel center. Rotating the pixel around the global rotation center in optimized angular increments, the desired trajectory will have pixel edges intersecting at their midpoints, as shown by the intersection of sampling pixel boxes 1408(1) and 1408(2) in FIG. 14(a). Shifting the pixel outward in the radial direction less than the pixel size (w) can guarantee overlap between the pixels on the ith ring and i−1th ring. Hence, the maximum radius of ring i is given by:

$$\rho_{i,max} = \frac{w}{2\tan\left(\frac{\Delta\theta_{i-1}}{2}\right)} + w \quad (34)$$

However, the integer operation in (33) moves the pixel intersections a little about the midpoints of the pixel edges. There are two extreme cases: when the intersections of pixels on the i−1th ring occur at the outer corners of the sampling pixel boxes 1408(1) and 1408(2) as shown in FIG. 14(b), and when the intersections of pixels on the i−1th ring occur at the inner corners of the sampling pixel boxes 1408(1) and 1408(2) as shown in FIG. 14(c). Missing sampling areas between the subsequent sampling pixels on the i−1th ring are at a minimum for intersections that occur at the outer corners as in FIG. 14(b), and at a maximum for intersections that occur at the inner corners a sin FIG. 14(c). However, (35) compensates for this variation by shortening the maximum radius of the ith ring to cover the missing areas in the i−1th ring when the intersection occurs further inward to the rotation center, and vice versa when the intersection occurs further outward in the radial direction. Note that these extreme cases with half pixel overlapping or missing areas hardly occur after optimization.

Thus, (34) provides a pixel area coverage constraint for sampling that can be combined with (32) and (33) to simplify the optimization algorithm as:

$$0 \leq \theta_{i,0} \leq \tan^{-1}(dY/[(i-1)dX]) \quad (35), \text{ and}$$

$$(i-1) \cdot dX \leq \rho_i \leq \sqrt{(i \cdot dX)^2 + dY^2} \quad (36).$$

When dX and dY are equal, the radial constraints of rings i and i+1 defined by (34) overlap. Replacing its upper bound by i·dX can reduce this sampling redundancy in the radial direction while keeping the radii constraints continuous between rings. Meanwhile, (34) provides another constraint to tighten radii. Hence, we can alter the upper bound in (36) such that $\rho_{i_{max}}=\min(w/(2\tan(\Delta\theta_{i-1}/2))+w, i\cdot dX$ when $w/(2\tan(\Delta\theta_{i-1}/2))+w>(i-1)\cdot dX$. Otherwise, $\rho_{i_{max}}=i\cdot dX$. For each ring i, its sampling interval $\Delta\theta_{i-1}$ can be initially calculated by setting $\rho_i = i \cdot dX$. Since (35) and (36) decouple the constraints for rotation angle and radii in each ring, the optimization computation can be simplified as a search for the best combination of $\rho_i$ and $\theta_{i,0}$ to minimize (29).

FIG. 15 shows a flowchart of illustrative CCTS optimization process 1500. CCTS optimization process 1500 includes two main algorithms: simulated annealing (SA) search (e.g., blocks 1518 through 1534) and optimized concentric circular trajectory scanning (OCCTS) (e.g., blocks 1504 through 1516). Two variables, α and β, are used to optimize $\theta_{i,0}$ and $\rho_i$, respectively, which are set to predetermined initial values at block 1502. In OCCTS, given a maximum ring number $R_{max}$, at block 1504, then at block 1506 $\theta_{i,0\ max}$ and $\rho_{i,max}$ are determined (e.g., by (35) and (36)) for the ith ring. Then, at block 1508, the angle and radius increment factors $\alpha_i$ and $\beta_i$ generate a pair of $(\theta_{i,0}, r_i)$ for the ith ring by:

$$\theta_{(i,0)} = \alpha(i) \cdot \theta_{(i,0),max} \quad (37) \text{ and}$$

$$\rho_i = \rho_{i,max} - \beta(i) \cdot \delta(i) \quad (38)$$

where $\delta(i) = \rho_{i,max} - \rho_{i-1}$, $\alpha(i) \in [0, 1)$ and $\beta(i) \in [0, 0.02)$. The number of samples N and rotation speed $\Delta\theta_i$ can be determined at block 1510 and, thus, a list of rotation angles for the ith ring can be determined. Blocks 1512 and 1514 operate to iteratively repeat blocks 1506 through 1510 for all of the rings. Once all the rings are complete, (29) is solved at block 1516.

Optimization is performed by SA search via blocks 1518 through 1534. SA models the physical annealing process of a solid, and simulates how the system reaches thermodynamic equilibrium at each fixed temperature (T initialized at block 1518) in the schedule of decreasing temperature (T updated at block 1520). The strategy is to perturb some existing suboptimal solution to move uphill in a controlled fashion. At block 1522, α and β are randomly perturbed to change the energy calculated by the CCTS algorithm, resulting in a change in energy ΔE determined at block 1524. If, at block 1526, ΔE<0, the new α and β are accepted as the starting points for the next move at block 1528. Otherwise, the uphill moves in energy, ΔE>0, need to be moderated by the current temperature T, and its acceptance probability, P, calculated by $e^{-\Delta E/T}$, is determined at block 1530. By accepting moves with increases in energy, SA avoids being trapped in the local minimum in early iterations and is able to explore globally for better solutions. Other optimization approaches might alternatively be employed. Imaging occurs after the optimization result has already been achieved, and thus the optimization computation time will not impact the imaging time. For example, process 1500 might be employed in block 408 of imaging process 400 to determine optimal scan trajectories.

Described embodiments of OCCTS achieve uniformity of the acquired information distribution in sampling, and improved performance of SR and image mosaicing using the sampling result. As the optimized sampling algorithm uses radii and rotational angles as variables, the uniformity of the sampling result is kept at larger radii.

Synthetic 100×100 reference images were generated using bicubic interpolation from four 500×500 HR images, which simulate continuous scenes. A 5×5 sized "average" box samples the HR images using the OCCTS method and generates 100×100 LR images in Cartesian coordinates after the polar-Cartesian transform and interpolation. Numeric comparison between the CCTS-sampled images and their corresponding reference images is performed in terms of root mean square error (RMSE) where pixel values are normalized to lie in the interval of [0,1]. For all of the four synthetic data, OCCTS can reduce distortion errors in the sampled images.

Rotation registration for SR might be performed in block 418 of imaging process 400. Rotation registration for SR might be resolved using various techniques, including total variation (TV), L1-normal (L1), simultaneous autoregressive (SAR), iterative backpropagation (IBP), and normalized convolution (NC). The first three algorithms are Bayesian methods that select different prior models on the HR image to be constructed for imposing image smoothness. Though these Bayesian methods have demonstrated high-quality SR images, it is known that SAR over-smoothes edge regions and TV and L1 over-smooth non-edge regions.

IBP iteratively minimizes the difference between the observed LR images and the constructed LR images. The difference between the paired computed LR images and original LR images is computed, and back-projected onto an HR reference frame. Each HR pixel value is updated by the weighted average of the contribution of its strongly influenced LR pixels. Robust SR can be achieved by using the median of the errors in the different back-projected images. NC employs interpolation techniques to fuse LR images to create a composite image of non-uniformly spaced samples. The irregular points are interpolated and resampled on a regularly spaced HR lattice to achieve SR. Compared to Bayesian methods, IBP and NC are faster.

As described in regard to FIG. 10, four LR images are generated for each 500×500 HR synthetic image. In each set, images vary from others by regular distinct small angles. Such angular variations can be achieved by adding the small regular angles to the initial angle of each sampling ring. Then, polar-Cartesian transform and interpolation are employed to generate LR images. Each set of LR images generates a 200×200 HR image for each SR algorithm. Reference 200×200 HR images are generated by bicubically interpolating the 500×500 HR images. The RMSE values are calculated between the SR images and their corresponding reference images. IBP produces the highest quality SR image.

Note that these RMSE values from SR include the RMSE from sampling. The reference HR image will be of higher quality than the CCTS SR results because described imaging techniques use only the variation from the angular dimension for SR. The variation from the radial dimension is difficult to involve in SR because it cannot be described by translation or rotation between LR images. Thus, the RMSE should only be used to compare the different CCTS methods and should not be used on its own as an indicator of SR quality. Additionally, the improvement in SR RMSE is not as significant as the improvement in sampling accuracy because OCCTS results in one optimized LR image and the other three LR images used for SR have lower uniformity for interpolating Cartesian cells.

Further, described embodiments employ "oriented energy" and Fourier spectrum to evaluate the recovered high frequencies and structures of an SR image. The oriented energy is a measure of the spectral power along a particular direction by optimally using a bank of steerable filters. Steerable filters synthesize an arbitrary orientation as a linear combination of "basis filters," such as the derivative of Gaussian filters. The oriented energy is the sum of the squared outputs of the filters centered on the image. The lowest frequency term can be used to approximate the dominant orientation in terms of direction and strength.

Figure 16:
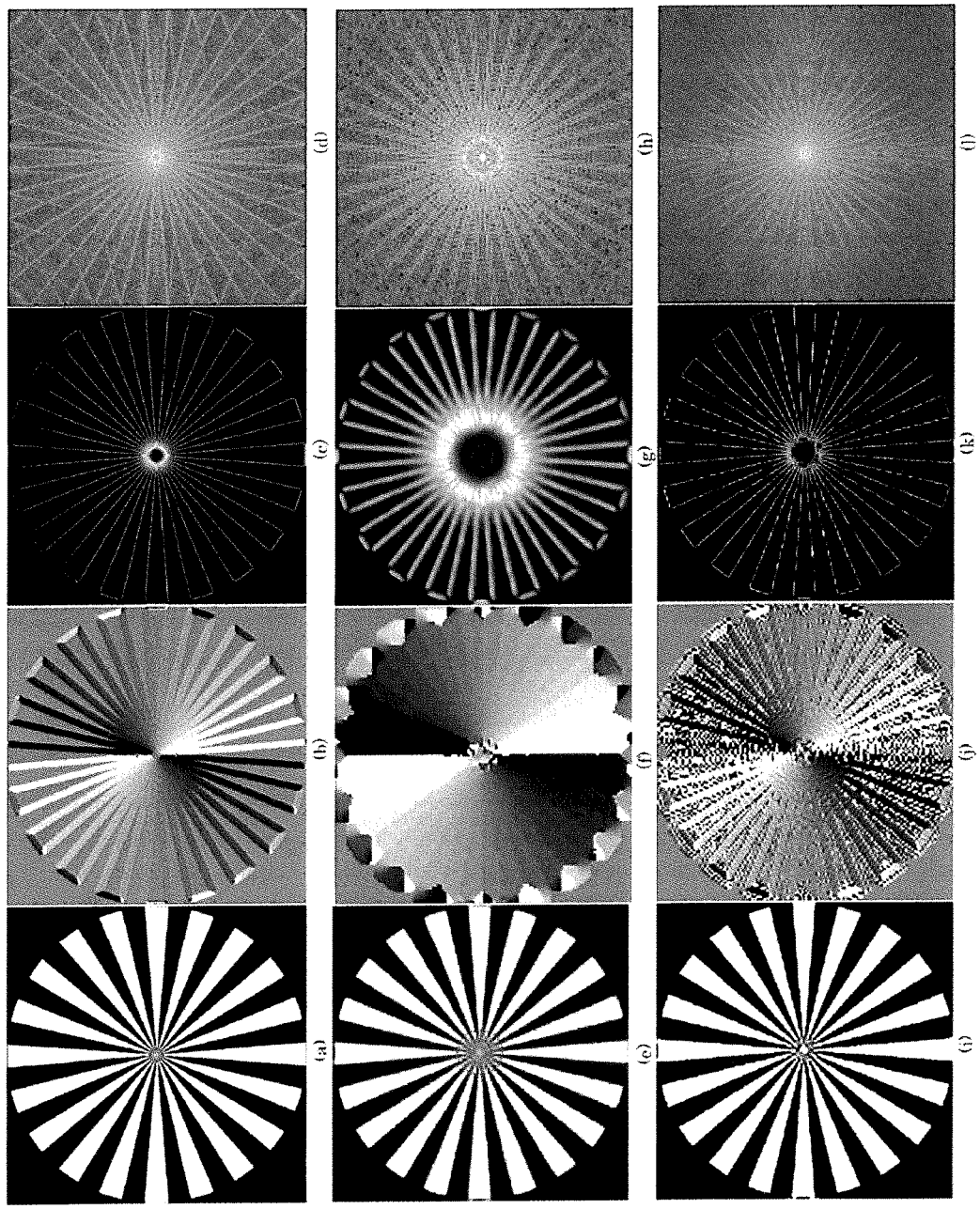
Figure 18:
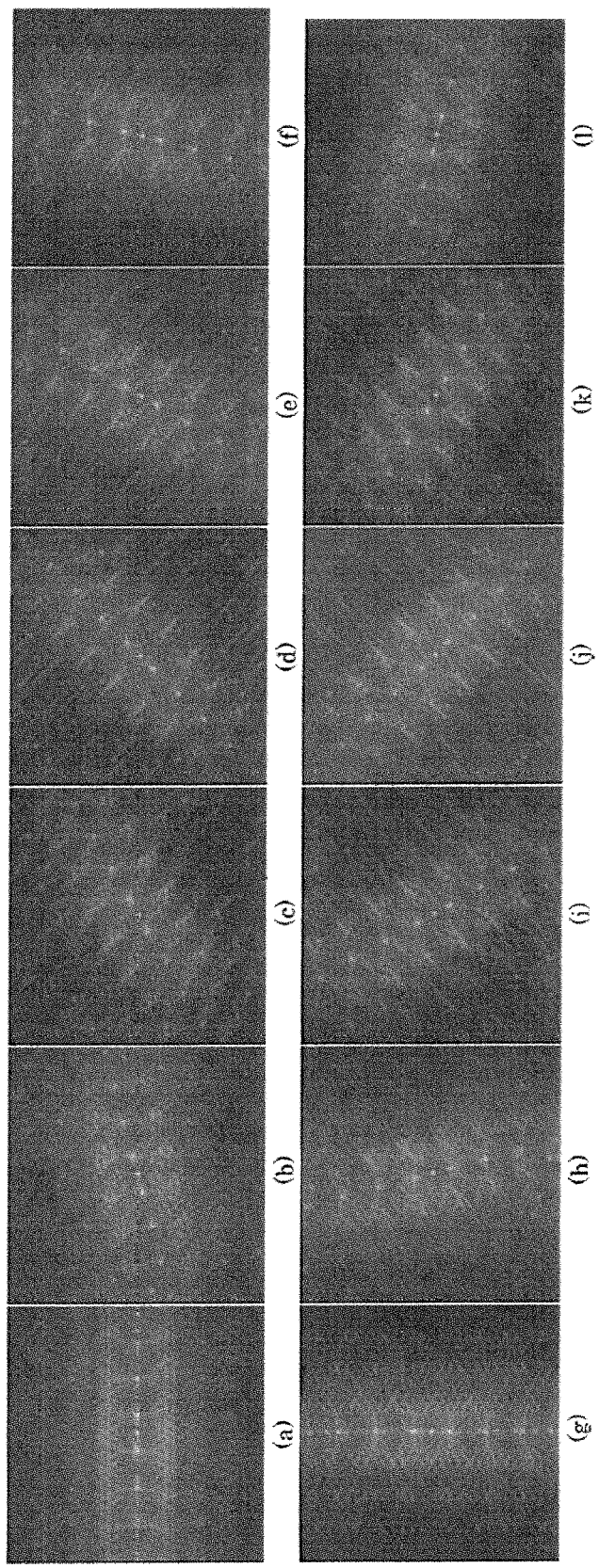

Two simulated targets are used to evaluate the performance of OCCTS-sampled images for SR including star sector (shown in FIG. 16) and a number of parallel and evenly spaced lines at various angles of tilt (shown in FIGS. 17 and 18). In FIGS. 16 and 17, from top to bottom, each row corresponds, respectively, to the HR reference image, LR image, and SR image of OCCTS-sampled LR images. From left to right, each column corresponds, respectively, to the full image, direction of dominant oriented energy, strength of the energy, and FFT spectrum. FIG. 16(a) is an HR ground truth star-sector pattern that has evenly distributed radial spokes, allowing evaluation of angular features. In the FIGS. 16(a), 16(e), and 16(i), the finest visible pattern details are circled to indicate ROIs. The visibility of the finest pattern details in the SR image of FIG. 16(i) is enhanced significantly compared to the LR image in FIG. 16(e).

The third column of FIG. 16 demonstrates the energy improvement, especially in the corresponding central ROIs, using SR in "oriented energy" maps. As shown, the spoke edges have wider energy edges in FIG. 16(g) corresponding to the missing direction edges in FIG. 16(f). The degraded features are significantly recovered in the SR image, with the sharp spoke energy edges in FIG. 16(k), and the wide direction edges in FIG. 16(j), corresponding to the ground truth in FIGS. 16(c) and 16(b). The spectrum spokes in FIG. 16(h) are much wider than those of FIG. 16(l) because of the blurring and aliasing effects from interpolation.

FIG. 17 illustrates the performance of described embodiments of OCCTS for rectilinear features for a number of arrays of parallel evenly spaced lines. Between the arrays, the tilting angles gradually change from −90° to 90°. FIG. 17(a) is an HR image of horizontal lines with spatial frequency of 35 line pairs per picture height (LP/PH) and image size of 490×490 pixels. The LR pixels are four times the size of the HR pixels [see FIG. 17(e)]. The LR patterns show an approximate uniform horizontal direction in FIG. 17(f) and a blurred oriented energy map in FIG. 17(g) compared to the ground truth uniform direction and sharp horizontal energy map in FIGS. 17(b) and 17(c). The SR image in FIG. 17(i) illustrates de-aliasing and de-blurring effects along the line pattern. FIG. 17(k) uncovers the dominant oriented energy in contrast with FIG. 17(g). Some diagonal artifacts in the SR images have not been reduced as shown in FIGS. 17(j) and 17(k), due to optimized rotational sampling only resulting in approximate uniform Cartesian coordinates [see FIG. 17(f)].

In the FFT spectrum, the LR image preserves three of the nine dominant frequencies in the HR image (see the bright spots along central vertical lines in FIGS. 17(h) and 17(d), respectively). In the SR images, all nine frequencies appear significantly in FIG. 17(l). SR images introduce noisy frequencies in FIG. 17(l) mainly because of noise that remained from FIG. 17(h). Note that because the discrete Fourier transform (DFT) assumes periodicity in the spatial domain, discontinuities in the actual pattern introduce complex noise into the Fourier spectrum [FIGS. 17(h) and 17(l)]. Such issues also appear in other FFT spectra shown in this paper.

Changing the spatial frequency and tilting angles, similar LR sampling and SR results are obtained. FIG. 18 shows the FFT spectrum maps of the pattern in FIG. 17(a) when tilted at angles varying from −90° to 75°. The bright spots in the SR images preserve the same counts and distribution as in FIG. 17(d), showing that OCCTS is robust to changes in rotational orientation for rectilinear features.

Figure 19:
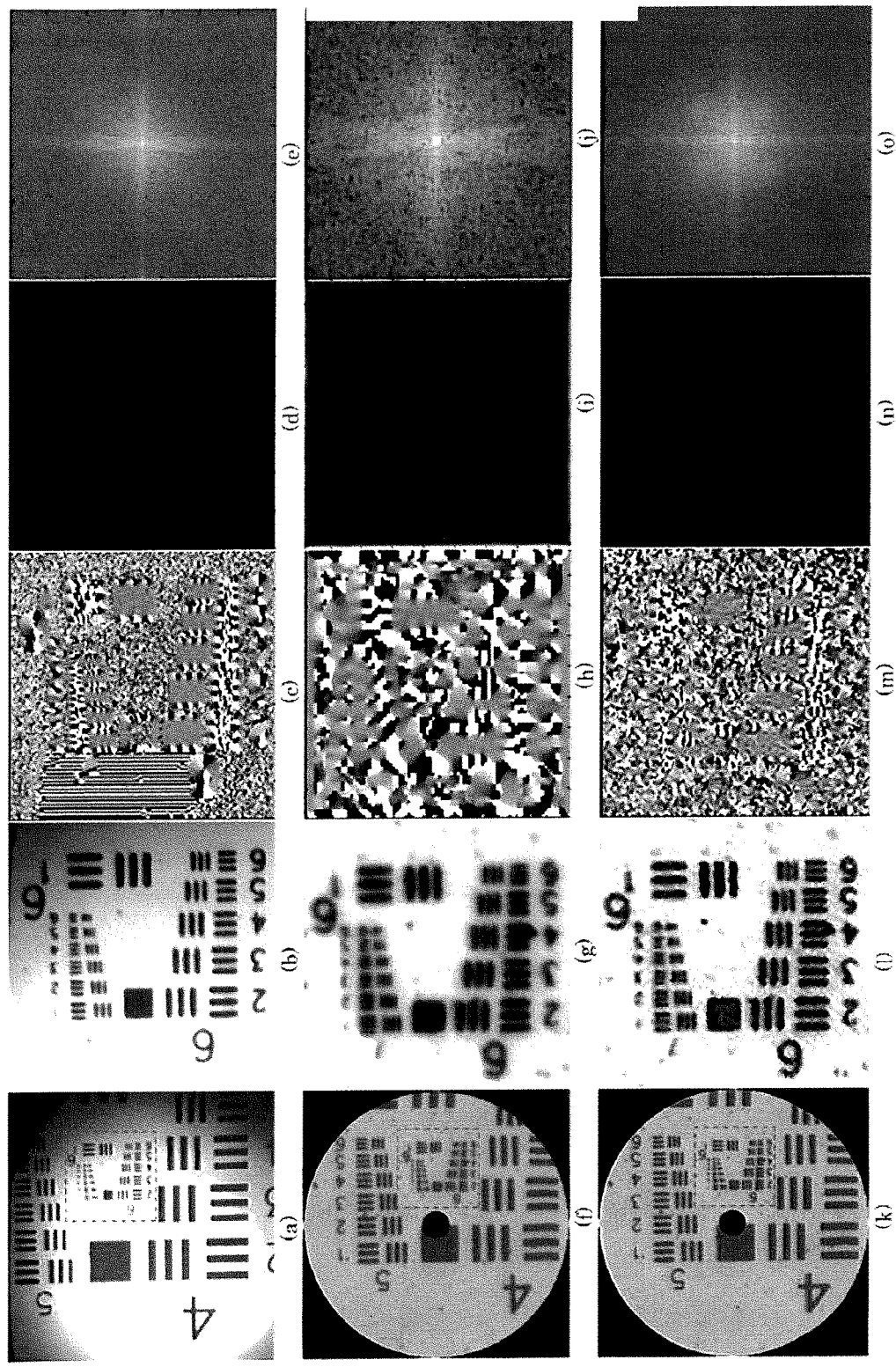

Applying the SR techniques using the imaging system 300 of FIG. 3, test target 800 of FIG. 8 (e.g., the 1951 U.S. Air Force resolving power test target (MIL-STD-150A)) is sampled. The real imaging and evaluation results are illustrated in FIG. 19. For each figure, from top to bottom, each row corresponds, respectively, to the HR reference image, LR image, and SR image of one-pixel-sampled LR images. In FIG. 19, from left to right, each column corresponds, respectively, to the full image, ROI, direction of dominant oriented energy, strength of the energy, and FFT spectrum.

As shown, the sampled images have uniform backgrounds, in contrast with those of the HR reference images, because they are not as influenced by illumination. The OCCTS LR images show wide energy direction edges while SR images have much variation in energy direction. The OCCTS SR images improve the visual discrimination of HR patterns. The FFT spectra illustrate that blurring and ringing effects in their SR images [FIG. 19(o)] are significantly removed compared, respectively, to their LR images [FIG. 19(j)].

Thus, described embodiments provide an optimized concentric circular sampling technique for HR and large-scale imaging. Rotational sampling maximizes the sampling speed while minimizing local information loss and redundancy. Hence, sampling distortion is reduced significantly for image generation. The sampling method combined with SR techniques can improve the achievable resolution of existing scanners with large FOV without additional hardware costs. The scanned LR images utilize variations in the angular dimension for SR imaging. Actively controlling the initial rotation angle of one-pixel sampling allows a priori knowledge of the global rotation variation for the SR algorithms to achieve satisfactory SR results. Among the five SR techniques using rotational registration, IBP produces the highest SR quality using angular variation for multiple LR CCTS images.

In some embodiments, only the variation in the angular direction is used for SR because sampling points are not regularly distributed along the radial direction. Other embodiments further improve the SR quality by using known sampling information in both the radial and angular directions since the circular sampling algorithm can offer prior knowledge of the sampling position of each LR pixel. The solution can be a novel SR method for the current sampling algorithm, or a revised rotational sampling algorithm for conventional SR methods. Although described in regard to imaging systems for stationary targets, imaging techniques described herein could be applied to moving targets. Additionally, described techniques could be employed for k-space sampling in magnetic resonance imaging where the nature of the sampling pattern and the speed of data acquisition play a major role.

Although described herein in relation to standard imaging, embodiments could be employed in other imaging modalities, such as dark field or fluorescence microscopy. Further described embodiments could employ integrated and synchronized multi-modal imaging sensors.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor can be analog, digital or mixed-signal.

While the exemplary embodiments have been described with respect to processes of circuits, described embodiments might be implemented as a single integrated circuit, a multi-chip module, a single card, or a multi-card circuit pack. Further, as would be apparent to one skilled in the art, various functions of circuit elements might also be implemented as processing blocks in a software program. Such software might be employed in, for example, a digital signal processor, micro-controller, or general purpose computer.

Some embodiments might be implemented in the form of methods and apparatuses for practicing those methods. Described embodiments might also be implemented in the form of program code embodied in tangible media, such as magnetic recording media, hard drives, floppy diskettes, magnetic tape media, optical recording media, compact discs (CDs), digital versatile discs (DVDs), solid state memory, hybrid magnetic and solid state memory, or any other machine-readable storage medium, wherein, when the program code is loaded into and executed by a machine, such as a computer, the machine becomes an apparatus for practicing the claimed invention.

Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

We claim:

1. A method of generating an image of a region of interest of a target object by an imaging system, the method comprising:
   determining a plurality of concentric circular scan trajectories to sample the region of interest, each of the plurality of concentric circular scan trajectories having a radius incremented by a pitch value from an innermost concentric circular scan trajectory having a minimum radius to an outermost concentric circular scan trajectory having a maximum radius;
   determining a number of samples for each of the plurality of concentric circular scan trajectories;
   wherein the determining a number of samples for each of the plurality of concentric circular scan trajectories comprises:
   determining, for each concentric circular scan trajectory, an angle increment and a radius increment; and determining, based upon the determined angle increment and the determined radius increment, a number of samples, a rotation speed, and a plurality of rotation angles for each concentric circular scan trajectory;
   determining a location of each sample for each of the plurality of concentric circular scan trajectories, the locations of each sample substantially uniformly distributed in a Cartesian coordinate system of the target object to reduce image distortion;
   iteratively rotating the target object along each of the concentric circular scan trajectories and capturing images at the determined sample locations; and
   generating a reconstructed image from the captured images.

2. The method of claim 1, wherein rotating the target object comprises:
   rotating the target object at a determined constant angular velocity, the determined constant angular velocity reducing vibration of the target object.

3. The method of claim 1, wherein rotating the target object comprises:
   rotating the target object at a determined constant linear velocity.

4. The method of claim 1, wherein the region of interest is circular, and the maximum radius is substantially equal to a radius of the region of interest.

5. The method of claim 1, wherein determining a location of each sample for each of the plurality of concentric circular scan trajectories comprises:
   mapping each sample location to Cartesian coordinates; and
   interpolating one or more neighboring sample locations.

6. The method of claim 5, wherein the interpolating comprises one of:
   nearest-neighbor interpolation; or
   linear interpolation.

7. The method of claim 1, further comprising:
   performing a simulated annealing search to optimize the one or more concentric circular scan trajectories.

8. The method of claim 1, wherein each of the plurality of rotation angles for each concentric circular scan trajectory is associated with a sample location.

9. The method of claim 1, further comprising:
   constraining at least one of: angular motion, rotational motion and pixel coverage area to interpolate one or more neighboring sample locations to overlap pixels on neighboring concentric circular scan trajectories.

10. The method of claim 1, wherein generating a reconstructed image from the captured images comprises:
    performing super resolution (SR) on one or more of the captured images to generate a high resolution output image wherein performing super resolution comprises:
    capturing a sequence of low resolution images for each concentric circular scan trajectory;
    performing iterative backpropagation to generate one or more super resolution images having sub-pixel resolution of corresponding ones of the sequence of low resolution images; and
    transforming the one or more super resolution images from a polar coordinate system to a Cartesian coordinate system.

11. The method of claim 10, further comprising:
    performing mosaicing of the one or more transformed super resolution images to generate a high resolution wide field of view composite output image.

12. The method of claim 11, wherein performing mosaicing comprises:
    stitching together one or more super resolution images for each concentric circular scan trajectory.

13. The method of claim 12, comprising:
    stitching together one or more super resolution images for each concentric circular scan trajectory independently of other concentric circular scan trajectories.

14. The method of claim 10, further comprising:
    reducing blurring and noise effects in the sequence of low resolution images by performing truncating singular value decomposition.

15. The method of claim 10, wherein capturing the sequence of low resolution images comprises:
    dividing each concentric circular scan trajectory into segments, each segment having a determined radial resolution and a determined angular resolution; and
    applying a regular shift in sub-pixel steps in a radial direction for each concentric circular scan trajectory to acquire low resolution images.

16. The method of claim 15, wherein the regular shift step is based upon a pixel size of the high resolution output image.

17. The method of claim 1, further comprising:
    synchronizing a camera frame rate of the imaging system, an illumination level of the imaging system, a translational movement speed of a target stage of the imaging system and a rotational movement speed of the target stage.

18. An imaging system for generating an image of a region of interest of a target object, the imaging system comprising:
    a camera configured to capture images of the target object; an illumination source configured to illuminate the target object; a target stage configured to receive the target object, the target stage configured to provide a translational movement and a rotational movement of the target object; and a controller configured to:
    determine a plurality of concentric circular scan trajectories to sample the region of interest, each of the plurality of concentric circular scan trajectories having a radius incremented from an innermost concentric circular scan trajectory having a minimum radius to an outermost concentric circular scan trajectory having a maximum radius;

determine a number of samples for each of the plurality of concentric circular scan trajectories;

wherein the controller is configured to:

determine, for each concentric circular scan trajectory, an angle increment and a radius increment; and determine, based upon the determined angle increment and the determined radius increment, a number of samples, a rotation speed, and a plurality of rotation angles for each concentric circular scan trajectory;

determine a location of each sample for each of the plurality of concentric circular scan trajectories, the locations of each sample substantially uniformly distributed in a Cartesian coordinate system of the target object to reduce image distortion;

control the camera and target stage to iteratively rotate the target object along each of the concentric circular scan trajectories and capture images at the determined sample locations; and generate a reconstructed image from the captured images.

19. The imaging system of claim 18, wherein the target stage is configured to rotate the target object at one of:

a determined constant angular velocity, the determined constant angular velocity reducing vibration of the target object; or a determined constant linear velocity.

20. The imaging system of claim 18, wherein the region of interest is circular, and the maximum radius is substantially equal to a radius of the region of interest.

21. The imaging system of claim 18, wherein the controller is configured to:

map each sample location to Cartesian coordinates; and interpolate one or more neighboring sample locations.

22. The imaging system of claim 21, wherein the controller is configured to interpolate one or more neighboring sample locations by one of:

nearest-neighbor interpolation; or by linear interpolation.

23. The imaging system of claim 18, wherein the controller is configured to:

perform a simulated annealing search to optimize the one or more concentric circular scan trajectories.

24. The imaging system of claim 18, wherein each of the plurality of rotation angles for each concentric circular scan trajectory is associated with a sample location.

25. The imaging system of claim 18, wherein the controller is configured to:

constrain at least one of: angular motion, rotational motion and pixel coverage area to interpolate one or more neighboring sample locations to overlap pixels on neighboring concentric circular scan trajectories.

26. The imaging system of claim 18, wherein the controller is configured to:

perform super resolution (SR) on one or more of the captured images to generate a high resolution output image.

27. The imaging system of claim 26, wherein the controller is configured to:

capture a sequence of low resolution images for each concentric circular scan trajectory;

perform iterative backpropagation to generate one or more super resolution images having sub-pixel resolution of corresponding ones of the sequence of low resolution images; and transform the one or more super resolution images from a polar coordinate system to a Cartesian coordinate system.

* * * * *